(12) United States Patent
Haarstick et al.

(10) Patent No.: US 11,538,058 B2
(45) Date of Patent: Dec. 27, 2022

(54) SYSTEM AND METHOD FOR MEASURING THE RELATIVE AND ABSOLUTE EFFECTS OF ADVERTISING ON BEHAVIOR BASED EVENTS OVER TIME

(71) Applicant: Comscore, Inc., Reston, VA (US)

(72) Inventors: Christopher S. Haarstick, Reston, VA (US); Todd Talkington, Arlington, VA (US); Devin Shields, Rixeyville, VA (US); Patrick Kemp, San Francisco, CA (US); Steven Millman, Reston, VA (US)

(73) Assignee: Comscore, Inc., Reston, VA (US)

( * ) Notice: Subject to any disclaimer, the term of this patent is extended or adjusted under 35 U.S.C. 154(b) by 0 days.

(21) Appl. No.: 16/838,980

(22) Filed: Apr. 2, 2020

(65) Prior Publication Data

US 2020/0234328 A1 Jul. 23, 2020

Related U.S. Application Data

(62) Division of application No. 14/214,607, filed on Mar. 14, 2014, now Pat. No. 10,614,481.

(60) Provisional application No. 61/800,458, filed on Mar. 15, 2013.

(51) Int. Cl.
*G06Q 30/02* (2012.01)
(52) U.S. Cl.
CPC ................ *G06Q 30/0242* (2013.01)
(58) Field of Classification Search
CPC .................................................. G06Q 30/0242
USPC ...................................................... 705/14.41
See application file for complete search history.

(56) References Cited

U.S. PATENT DOCUMENTS

| 7,260,837 B2 | 8/2007 | Abraham et al. |
| 2004/0019518 A1 | 1/2004 | Abraham et al. |
| 2013/0204710 A1* | 8/2013 | Boland ............... G06Q 50/01 705/14.66 |

(Continued)

FOREIGN PATENT DOCUMENTS

| WO | 2008138375 A1 | 11/2008 | |
| WO | WO-2008138375 A1 * | 11/2008 | ....... G06F 17/30873 |

OTHER PUBLICATIONS

N Rawlinson, Rapid estimation of relative and absolute delay times across a network by adaptive stacking (Year: 2004).*

(Continued)

*Primary Examiner* — Tarek Elchanti
(74) *Attorney, Agent, or Firm* — Blank Rome LLP

(57) ABSTRACT

The systems and techniques described herein measure advertisement effectiveness of behavior-based outcomes (e.g., site visit, number of pages consumed, searches, online and offline transactions). The system implemented an automated model to measure the impact of exposures and impressions on outcomes using uses panel data, cookie-based data, and combinations thereof. The techniques use test and control approach to calculate effectiveness, where the test group are those exposed to a campaign and a control group who is not exposed. For those exposed, a running analysis of impressions (and other variables) in a pre period is used to determine behavior based outcomes over a set time period after that exposure. As a result, the automated model is able to generate metrics that show absolute and relative impacts on future behavior.

19 Claims, 13 Drawing Sheets

(56) References Cited

U.S. PATENT DOCUMENTS

2013/0290070 A1 10/2013 Abraham et al.
2014/0130076 A1 5/2014 Moore et al.

OTHER PUBLICATIONS

Lia Zarantonello and Bernd H. Schmitt, The impact of event marketing on brand equity: the mediating roles of brand experience and brand attitude, 2012 (Year: 2012).*
Capgemini, Predictive Modeling Using Transactional Data, 2011.*
Capgemini, Predictive Modeling Using Transactional Data, 2011 (Year: 2011).*
N. Rawlinson, B. L. N. Kennett, "Rapid estimation of relative and absolute delay times across a network by adaptive stacking", 2004 (Year: 2004) [Cited in related U.S. Appl. No. 14/214,607].

\* cited by examiner

SYSTEM AND METHOD FOR MEASURING THE RELATIVE AND ABSOLUTE EFFECTS OF ADVERTISING ON BEHAVIOR BASED EVENTS OVER TIME

CLAIM OF PRIORITY

This application is a divisional of U.S. patent application Ser. No. 14/214,607, filed Mar. 14, 2014, which claims the benefit to U.S. Provisional Patent App No. 61/800,548, filed Mar. 15, 2013, which are herein incorporated by reference in their entirety.

BACKGROUND

In general, advertisers want metrics that inform the advertisers about the effectiveness of a given advertising campaign. For example, advertisers may want to understand how a given advertising campaign affects user behavior, such as visiting a website, conducting a search for a product, and making a purchase to name a few. However, traditional test and control measures used to determine the effectiveness of advertising campaigns typically only look at the last exposure and do not account for frequency. In addition, these test and control measures do not handle a variety of impression types or overlapping of impressions. As a result, traditional test and control measures have difficulty in attributing relative credit to the impact of advertising given the different number of publishers and impression types found in today's marketplace.

SUMMARY

The systems and techniques described herein measure advertisement effectiveness of behavior-based outcomes (e.g., site visits, number of pages consumed, searches performed, and online and offline transactions). The automated system implements the model to measure the absolute and relative impact of exposures and impressions on outcomes using panel data, cookie-based data, and combinations thereof.

In one general aspect, the systems and methods described herein implement a statistical model to measure the incremental impact of digital advertising and report the results in a format such that advertisers can make informed decisions about use of advertising revenue and placement in addition to the overall effectiveness of their advertising campaigns. The model is automated by a system to provide scalable, panel-based attribution solution that identifies the actual independent drivers of lift using behavior based outcomes that can be applied to any number of outcome measures or exposure types. The automated model uses a regression framework to measure across all attributes to measure the lift or the impact of the attributes to the digital advertising. In addition, the outcome variables of interest are behavior based and have a temporal element. To ensure that the correlation between an impression served and a corresponding behavior can be inferred to be causative, the data can be aligned to measure a defined prior time period of impressions versus a future time period of the behavior. Therefore, to capture most of the data the methodology employs a rolling temporal analysis (e.g., daily), where the model is built for each time period and summary metrics are determined. The temporal analysis for each time period may then be used to determine other time periods (e.g., weekly, monthly, quarterly, or for a whole campaign).

In another general aspect, for every advertising campaign different publisher/creative combinations are examined; however, any number of different combinations may be examined as specified by a particular advertiser (e.g., TV/mobile combination). For each publisher/creative combination: a start analysis date is determined, measurements are limited to unique entities (e.g., machines associated with people who match specified attributes like demographics), a "pre period window" time period before the start date is set, the exposures for a uniquely identified entity (e.g., for each cookie or machine or combination thereof) during the pre-window time period is measured. A "post period window" of future time also is set, which is used to analyze the unique entities' impressions. A test group is determined from the sample of unique entities exposed to the campaign in the pre-period, and a control group is formed from those not exposed. Both the test and control groups have an expected average outcome response. The lift is measured as the difference between the expected response rate of the two groups. The window then slides forward for a new analysis date until the end of the campaign to calculate lift for each time period (e.g., day) of the campaign to provide metrics of lift for each time period (e.g., day) of the campaign. The different publisher/creative combinations are calculated using multiple regression modeling techniques and the results are used to compare them against each other to show the larger campaign lift. The determined metrics may be provided in various reports or dashboards allowing advertisers to understand what the impact of the campaign was and what contributed to the impact (e.g., whether the impact was due to raw reach, frequency, or good creatives).

In another general aspect, a data processing system includes one or more storage devices comprising pre-formatted temporal user data aggregated over time; and one or more data processing devices. The one or more data processing devices are configured to: one or more data processors configured to: access the aggregated pre-formatted temporal user data; read the accessed data for each discrete time unit for a predetermined run period; parse variables from the read data; automatically derive a modeling function from the variables parsed from the read data, where the derived model compares pre-formatted user data for a pre-determined pre-period window of time prior to a discrete time unit to pre-formatted user data for a post-period window of time after the discrete time unit; apply the derived modeling function to determine one or more metrics for the read data for each discrete time unit in the predetermined run period; aggregate the metrics for the predetermined run period; and provide an indication of the impact of advertising on one or more predetermined outcomes in the corresponding run period.

The system may determine lift as the indication of the impact of the advertising, where lift is determined as the difference in the expected outcome of those exposed to at least one impression from an advertising campaign from those not exposed to the campaign. The system also may determine lift percent as the indication of the impact of the advertising, where lift percentage is the difference in the expected outcome of those exposed to at least one impression from an advertising campaign from those not exposed to the campaign divided by the expected outcome of those not exposed to the campaign.

The system also may generate a user interface providing an indication of at least one of absolute impact and relative impact of advertising on the one or more predetermined outcomes in the corresponding run period.

The parsed variables may be identified as one of five basic variable types comprising gross impression variables; time adjusted variables; outcome variables; balancing variables; and demographic variables.

The system may derive a statistical binomial model for certain variables identified from the parse or a statistical continuous model for certain variables identified from the parse.

The statistical binomial model may be a Logistic Model that is run for binary outcome actions, and the statistical continuous model is a Poisson Model with over-dispersion metric for zero bounded continuous actions is run.

The system may provide an indication of at least one of absolute impact and relative impact of advertising on the one or more predetermined outcomes in the corresponding run period.

The derived model may compare exposures to impressions in pre-formatted user data for the predetermined pre-period window of time prior to a discrete time unit to one or more outcomes in the pre-formatted user data for a post-period window of time after the discrete time unit.

In yet another general aspect, a computer implemented method includes: providing one or more parameters to a data processing system including a pre period timing, a post period timing, a run period, and the attributes to analyze for one or more outcomes for which analysis is specified; accessing by the data processing system user impression and behavioral data from one or more databases to gather and format user impression and behavioral data, where gathering and formatting the user impression and behavioral data include: aggregating the behavioral data for the specified pre-period and post periods for each discrete time unit for a period of time; aggregating the impressions by discrete time unit for the period of time; and applying a running regression analysis automatically derived from the aggregated, formatted behavioral and impression data by the data processing system to determine one or more metrics indicating the impact of advertising on the one or more specified outcomes in the corresponding run period.

The method may further include applying recency scalar to the impression data to weight exposures based on the length of time between the exposure and a discrete time unit.

The method when applying a running regression analysis automatically derived from to the aggregated, formatted behavioral and impression data may further include: reading the formatted user data for each discrete time unit for a predetermined run period; parse variables from the read data; automatically deriving a modeling function from the variables parsed from the read data, where the derived model compares formatted user data for a predetermined pre-period window of time prior to a discrete time unit to formatted user data for a post-period window of time after the discrete time unit; applying the derived modeling function to determine one or more metrics for the read data for each discrete time unit in the predetermined run period; aggregate the metrics for the predetermined run period; and providing an indication of the impact of advertising on one or more predetermined outcomes in the corresponding run period.

The method when providing an indication of the impact of advertising may further include providing an indication of at least one of absolute impact and relative impact of advertising on the one or more predetermined outcomes in the corresponding run period.

The method when providing an indication of the impact of advertising may further include providing an indication showing both the absolute impact and relative impact of advertising on the one or more predetermined outcomes in the corresponding run period.

The method may further include generating a user interface configured to present the indication of the impact of advertising including providing an indication of at least one of absolute impact and relative impact of advertising on the one or more predetermined outcomes in the corresponding run period.

In yet another general aspect, a computer implemented method includes: accessing the aggregated pre-formatted temporal user data; read the accessed data for each discrete time unit for a predetermined run period; parsing variables from the read data; automatically deriving a modeling function from the variables parsed from the read data, where the derived model compares pre-formatted user data for a predetermined pre-period window of time prior to a discrete time unit to pre-formatted user data for a post-period window of time after the discrete time unit; applying the derived modeling function to determine one or more metrics for the read data for each discrete time unit in the predetermined run period; aggregating the metrics for the predetermined run period; and providing an indication of the impact of advertising on one or more predetermined outcomes in the corresponding run period.

The method when applying the derived modeling function may further include determining lift as an indication of the impact of the advertising, where lift is determined as the difference in the expected outcome of those exposed to at least one impression from an advertising campaign from those not exposed to the campaign.

The method when may further include determining lift percent as the indication of the impact of the advertising, where lift percentage is the difference in the expected outcome of those exposed to at least one impression from an advertising campaign from those not exposed to the campaign divided by the expected outcome of those not exposed to the campaign.

The parsed variables may be identified as one of five basic variable types comprising gross impression variables; time adjusted variables; outcome variables; balancing variables; and demographic variables.

The method when applying the derived modeling function may further include applying one of a statistical binomial model for certain variables identified from the parse and a statistical continuous model for certain variables identified from the parse.

The statistical binomial model may be a Logistic Model that is run for binary outcome actions, and the statistical continuous model may be a Poisson Model with over-dispersion metric for zero bounded continuous actions that is run.

In yet another general aspect, a data processing system includes: one or more storage devices; and one or more processing devices. The one or more processing devices are configured to: receive parameters to including a pre period timing, a post period timing, a run period, and the attributes to analyze for one or more outcomes for which analysis is specified; access user impression and behavioral data from at least one of the storage devices; aggregate the behavioral data for the specified pre-period and post periods for each discrete time unit for a period of time; aggregate the impressions by discrete time unit for the period of time; and apply a running regression analysis automatically derived from the aggregated behavioral and impression data to determine one or more metrics indicating the impact of advertising on the one or more specified outcomes in the corresponding run period.

The system may determine lift as an indication of the impact of the advertising, where lift is determined as the difference in the expected outcome of those exposed to at least one impression from an advertising campaign from those not exposed to the campaign.

The system may determine lift percent as the indication of the impact of the advertising is determined by the at least one of the processors, where lift percentage is the difference in the expected outcome of those exposed to at least one impression from an advertising campaign from those not exposed to the campaign divided by the expected outcome of those not exposed to the campaign.

The parsed variables may be identified as one of five basic variable types comprising gross impression variables; time adjusted variables; outcome variables; balancing variables; and demographic variables.

The derived model function applied by the system may be one of a statistical binomial model for certain variables specified identified from the parse and a statistical continuous model for certain variables identified from the parse and a statistical continuous model for certain variables specified from the parse.

The system when applying a running regression analysis automatically derived from to the aggregated, formatted behavioral and impression data, at least one of the one or more processors may be configured to: read the formatted user data for each discrete time unit for a predetermined run period; parse variables from the read data; automatically derive a modeling function from the variables parsed from the read data, where the derived model compares formatted user data for a predetermined pre-period window of time prior to a discrete time unit to formatted user data for a post-period window of time after the discrete time unit; apply the derived modeling function to determine one or more metrics for the read data for each discrete time unit in the predetermined run period; aggregate the metrics for the predetermined run period; and provide an indication of the impact of advertising on one or more predetermined outcomes in the corresponding run period Implementations of any of the techniques described in this document may include a method or process, an apparatus, a machine, a system, or instructions stored on a computer-readable storage device. The details of particular implementations are set forth in the accompanying drawings and description below. Other features will be apparent from the following description, including the drawings, and the claims.

DETAILED DESCRIPTION

Figure 1A:
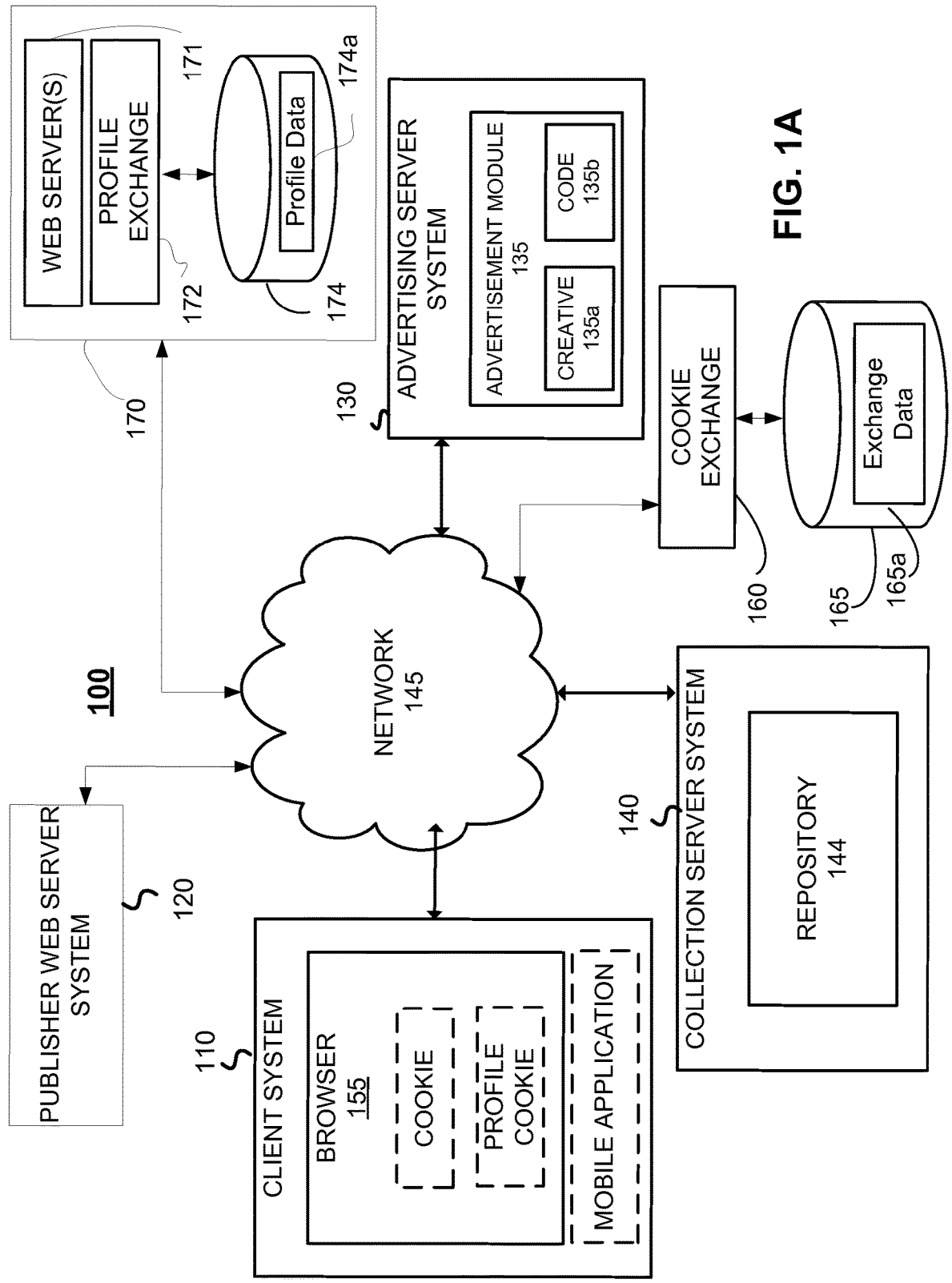
FIG. 1A is a block diagram of an example of a system for providing advertisements to viewers of web pages or other network-accessible resources and to measure consumer responses of at least some of those viewers.

The systems and techniques described herein in general measure advertisement effectiveness on behavior-based outcomes (e.g., site visit, # pages consumed, searches, online and offline transactions). The model measures the impact of exposures and impressions on outcomes using user panel data, cookie-based or other uniquely identifying data, and combinations thereof. The techniques use a test and control approach to calculate effectiveness.

In this approach an analysis date is determined for which a "pre-period window" time period before the analysis date is set, the exposures for a uniquely identified entity (e.g., for each cookie or machine or combination thereof) during the pre-window time period is measured. A "post-period window" of future time also is set, which is used to analyze the unique entities' impressions. A test group is determined from the sample of unique entities exposed to the campaign in the pre-period, and a control group is formed from those not exposed.

Overview

The model is a statistical model measuring the incremental impact of digital advertising. The model is automated by a system to provide scalable, panel-based attribution solution that identifies the actual independent drivers of lift using behavior based outcomes that can be applied to any number of outcome measures or exposure types. The automated model uses a regression framework to measure across all attributes and determines the lift or the impact of the attributes to the digital advertising. In addition, the outcome variables of interest are behavior based and have a temporal element. To ensure that the correlation between an impression served and a corresponding behavior can be inferred to be causative, the data can be aligned to measure a defined prior time period of impressions versus a future time period of the behavior. Therefore, to capture most of the data the methodology employs a rolling temporal analysis (e.g., daily), where the model is built for each time period and summary metrics are determined. The temporal analysis for each time period may then be used to determine other time periods (e.g., weekly, monthly, quarterly, or for a whole campaign).

In one general aspect, for every advertising campaign different publisher/creative combinations are examined; however, any number of different combinations may be examined as specified by a particular advertiser (e.g., TV/mobile combination). For each publisher/creative combination: a start analysis date is determined, measurements are limited to unique entities (e.g., machines associated with people who match specified attributes like demographics), a "pre period window" time period before the start date is set, the exposures for a uniquely identified entity (e.g., for each cookie or machine or combination thereof) during the pre-window time period is measured. A "post period window" of future time also is set, which is used to analyze the unique entities' impressions. A test group is determined from the sample of unique entities that are exposed to the campaign in the pre-period, and a control group is formed from those entities that are not exposed. But, both test and control groups have an expected average outcome response. The lift is measured as the difference between the expected response rates for the two groups. The window then slides forward for a new analysis date until the end of the analysis period (e.g., the time of an advertising campaign). Lift is calculated for each day of the analysis period to provide metrics for the lift for each day of the analysis period. After all the different publisher/creative combinations are calculated, regression modeling is used to compare them against each other and show the larger overall lift. The metrics determined by the system may be provided in various reports or dashboards allowing advertisers to understand what the impact of the campaign was and what contributed to the impact (e.g., whether the impact was due to raw reach, frequency, or good creatives).

Collecting Exposure Test and Control

Figure 1B:
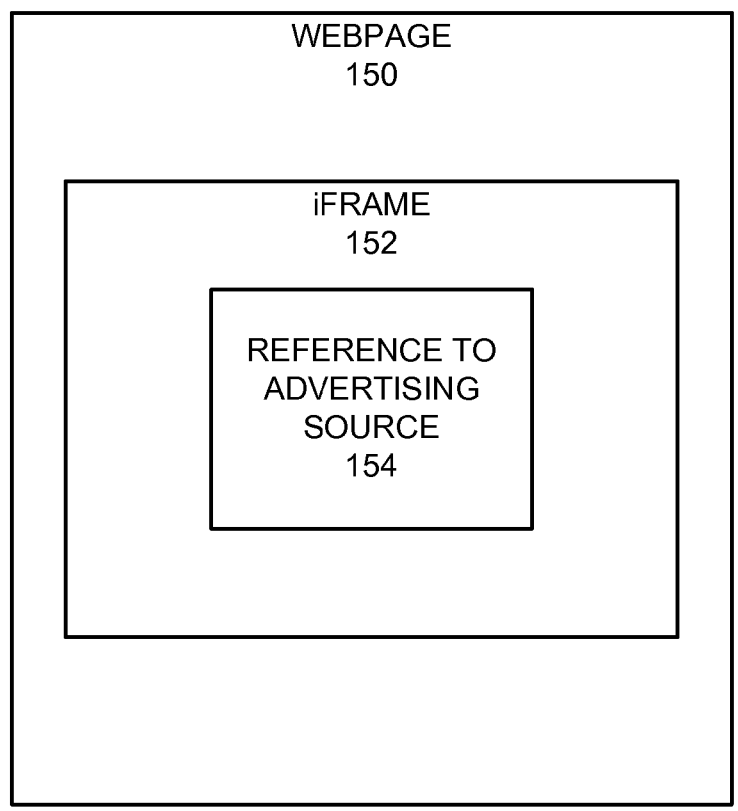
FIG. 1B shows an example block diagram of a web page.
Figure 1C:
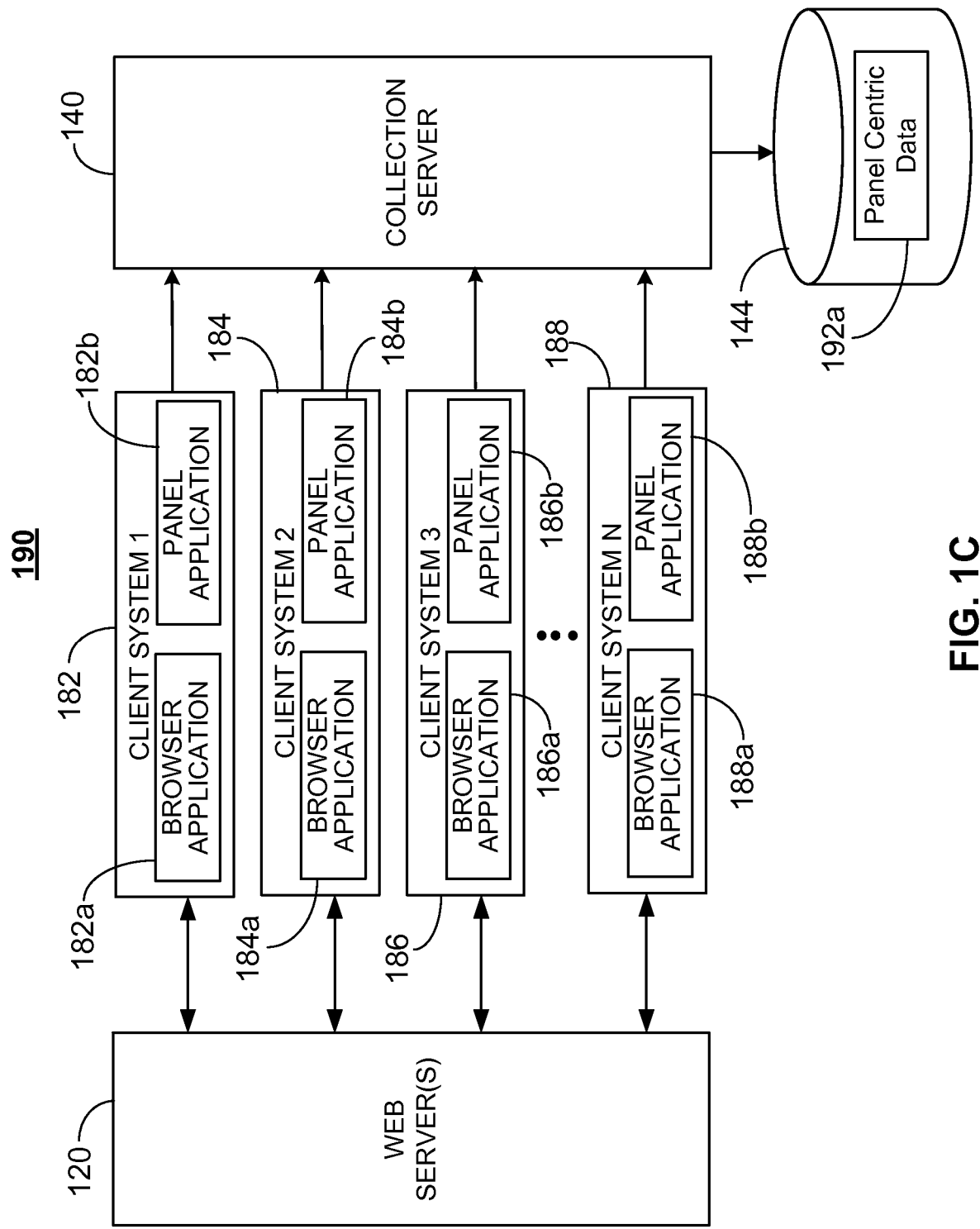
FIG. 1C illustrates an example of a system in which a panel of users may be used to perform Internet audience measurement.

FIGS. 1A-1C illustrate examples of a system that may be used to collect user data of exposures to impressions of a creative across many publishers and sources.

Referring to FIG. 1A, a system 100 includes one or more client systems 110, one or more publisher web server systems 120, one or more advertising server systems 130, and one or more collection server systems 140 that communicate and exchange data through a network 145. The system 100 may be used to provide digital advertisements to viewers of web pages or other network-accessible resources and to measure consumer responses of at least some of those viewers.

Each of the client system 110, the publisher web server system 120, the advertising server system 130, and the collection server system 140 may be implemented using, for example, one or more processing devices capable of responding to and executing instructions in a defined manner, including, for instance, a general-purpose computer, a personal computer, a special-purpose computer, a workstation, a server, or a mobile device. The client system 110, the publisher web server system 120, the advertising server system 130, and the collection server system 140 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the client system 110, the publisher web server system 120, the advertising server system 130, and the collection server system 140. The instructions in conjunction with the processing device make the processing device operative or configured to perform certain actions based on the instruction thereby transforming the processing device into a specific machine cable of performing the actions.

In general, the client system 110 includes a web browser 155 that can be used by a user of the client system 110 to retrieve and present web pages or other resources from the network 145, such as the Internet. The publisher web server system 120 may store such web pages, content, or other resources, and transmit those web pages, content, and otherwise make the resources available to the client system 110 when requested by the web browser 155.

The advertising server system 130 may store one or more advertisement modules 135 that are retrieved and rendered as part of one or more of the web pages provided by the publisher web server system 120. The advertising module 135 may be, for example, implemented as a Hypertext Markup Language (HTML) file, a shockwave application, or a Java applet.

The advertising module 135 includes an advertising creative 135a. The advertising creative 135a in a given advertisement module 135 is the image, video, sound, graphics, text, animations, or other information that is to be presented when the advertising module 135 is rendered by a web browser and the displayed creative is to be perceived by a person.

While only a single advertisement module is illustrated, the advertising server system may store multiple advertisement modules, and the advertisement modules may be organized according to advertising campaigns. In general, an advertising campaign is a collection of one or more advertisement messages or creatives that share a single idea and/or theme and which typically form an integrated marketing communication (IMC). Thus, the advertisement modules 135 that include creatives 135a belonging to the same advertising campaign may be grouped together as being part of the advertising campaign, and the advertisement modules 135 that include creatives 135a belonging to the same advertising campaign may be associated with a campaign identifier.

The advertising module 135 also includes code 135b. The code 135b is executed by a processing device when the advertising module 135 is rendered by a web browser (typically as part of a web page, as described below). When the code 135b is executed, the code 135b performs functions related to tracking exposures of the creatives in the advertising campaign as well as providing surveys, as described further below.

FIG. 1B is a diagram illustrating an example of a web page 150 that may be provided by the publishing web server system 120. The web page 150 may include an iFrame 152, which may be located in a portion of the web page 150 reserved for presenting an advertisement. The iFrame 152 acts as a container, or placeholder, for content and the iFrame 152 includes a reference (e.g., a uniform resource locator (URL)), or a pointer, to an advertising source 154. The advertising source 154 may be, for example, the advertising server system 130. Through the reference to the advertising source 154, the iFrame 152 obtains content for display within the iFrame 152 from the advertising source. For example, the iFrame 152 may reference the advertising server system 130 such that an advertising module 135 is downloaded to the client computer 110 and rendered within the iFrame 152, which may result in the creative 135a being displayed in the iFrame 152 (and thus in the rendered web page) and the code 135b being executed.

Referring again to FIG. 1A, during operation, the client system 110, through the web browser 155 or any other application (e.g., mobile applications or apps), requests a web page (or other content and/or resources), such as the web page 150, from the publishing web server 120. The publishing web server system 120 sends the web page 150 to the client system 110 and the web page 150 is rendered or otherwise presented by the web browser 155 or app. When the iFrame 152 is rendered, the reference 154 results in the web browser 155 or app sending a request to the advertising server system 130 for an advertisement module 135. The advertising server system 130 selects a particular advertisement module 135 and returns the selected advertisement module 135 to the client system 110 for rendering or presentation by the web browser 155 or app in the iFrame 152 or other display format. While an example employing an iFrame is described, other implementations may include the advertisement module 135 in the web page without using an iFrame. For example, a beacon can be implemented using an imbedded image, object, tag, or script. The beacon is rendered with the web content in which the beacon is included. When rendered or otherwise employed, the browser or other application sends a message request to the collection servers 140.

When the advertisement module 135 is rendered, the creative 135a is displayed in the iFrame 152. In addition, the code 135b is executed. In general, the code 135b includes exposure code for tracking and reporting the number of times the creative 135a, or another creative in the advertising campaign, has been displayed by the browser 155 or otherwise presented (referred to as beacon code). The code 135b also includes survey code for determining whether the user viewing the web page should be solicited to take a survey, as well as providing the survey if the user agrees to take the survey.

In particular, when the beacon code 135b is rendered or executed, the beacon code 135b causes the browser application 155 or app to send a message to the collection server 140. This message includes certain information. For example, in one implementation, the beacon message may include a campaign project identifier, a creative identifier, an exposure frequency parameter, a client identifier, and an identifier (e.g., URL) of the web page in which the advertisement module 135 is included. The beacon message can also include a timestamp indicating a time and a date at which an exposure occurred.

The campaign project identifier identifies the advertising campaign of which the particular creative 135a included with the advertisement module 135 is a part. The campaign project identifier also may identify the associated brand, product, or service associated with the campaign. The creative identifier identifies the specific creative 135a included with the advertisement module 135. As noted earlier, multiple creatives can be associated with the campaign.

The exposure frequency parameter indicates how many times a user of the client system 110 has been exposed to a particular creative in the campaign. The number of times a creative has been displayed on the client system 110, or at least by the particular web browser 155 or app, may act as a surrogate for the actual number of times a given user has been exposed to the creative. This approximation may be useful in scenarios in which it is difficult or impossible to track the actual number of times a particular user is exposed to the creative.

In some implementations, the exposure frequency parameter and other parameters are stored in a cookie on the client system 110. For example, a cookie can store exposure frequency parameters for each creative displayed by the client system 110. The beacon code 135b may access the cookie, update an exposure frequency parameter in the cookie (to account for the current exposure), and include the updated exposure frequency parameter in the beacon message. Exposure frequency parameters may be associated with a particular campaign identifier. As a result, multiple exposure frequency parameters and campaign identifiers may be stored in the cookie to indicate the number of exposures to various creatives in different campaigns. In other implementations, different cookies may be used for different campaigns.

As noted above, the message may also include a unique identifier for the client system 110 (or at least web browser 155). For example, when a client system first sends a beacon message to the collection server 130, a unique identifier may be generated for the client system 110 (and associated with the received beacon message). That unique identifier may then be included in the cookie that is set on that client system 110. As a result, later beacon messages from that client system (or at least from the browser 155) may have the cookie appended to them such that the messages include the unique identifier for the client system 110, or the client identifier may be retrieved from the cookie and included in a parameter of the beacon message. If a beacon message is received from the client system 110 without the cookie (e.g., because the user deleted cookies on the client system 110 or the user of client system 110 is using a browser other than browser 155), then the collection server 140 may again generate a unique identifier and include that identifier in a new cookie set of the client system 110.

The beacon message also may include the URL of the web page in which the advertisement module 135 is included. The beacon code 135b may make a call to the browser 155 for this information, and populate the URL in a parameter of the beacon message.

As an example, the beacon may collect the information to be included in the beacon message as needed and send the beacon message, including the information, to the collection server 140 as an HTTP message request (e.g., a GET request, Post request, or any other standard message type) that includes the information (e.g., a URL) in a query string. In one example, the beacon code may be JavaScript code that collects the information as appropriate, and includes that information in the source attribute of an <SCRIPT> tag, which results in a request for the resource located at the URL in the source attribute of the <SCRIPT> tag to the collection server 140. In another example, the beacon may be an <IMG> tag call which also results in a request for the resource located at the URL in the source attribute of the <IMG> tag to be sent to a server of the collection server 140. Because the information is included in the source attribute, the collection server 140 receives the information. The collection server 140 can then return a transparent image.

The following is one example of such a JavaScript:

```
<script type="text/javascript">
document.write("<img    id='img1'    height='1'
width='1'>");document.getElementById("img1").src="http://example.com/scripts/report.dll?P1=
```

```
" + escape(window.location.href) + "&rn=" + Math.floor(Math.random( )*99999999);
    </script>
```

The collection server 140 records the information received in the message with, for instance, a time stamp of when the message was received and the IP address of the client system 110 from which the message was received, and/or the user-agent of the browser application. The collection server 140 aggregates this recorded information and stores this aggregated information in repository 144 as exposure data. The collection server 140 can identify occurrences of the client system 110 (or browser) identifier in the exposure data to determine the history of exposures for a particular client system 110 (or browser). The collection server 140 can thus extract exposure history information for the client device 110 that indicates, for example, which creatives were displayed, the number of times each creative was displayed, and on which web page each display occurred.

Also as noted above, the beacon code 135b may also includes survey code that evaluates certain parameters to determine whether to solicit the user viewing the web page to take a survey. For example, the survey code may evaluate a frequency at which surveys should be solicited, as well as whether or not a survey has been solicited on the client system 110 (which may be indicated, for example, in a cookie on client system 110).

If so, the survey code may cause an invitation to be displayed in web browser 155, where the invitation invites the user to take the survey. Assuming the user agrees to take the survey, the survey code displays the survey, for example, by opening another window or tab of browser 155 and causing the browser 155 to retrieve and display the survey. For instance, the survey may be retrieved from the collection server system 140.

In general, the survey includes questions related to a particular, desired consumer response to the creatives in the advertising campaign. For instance, the survey may include questions related to brand favorability (whether a consumer has a positive attitude towards the brand), brand preference (whether a consumer selects a brand or product out of a list including other brands or products), intent to purchase (whether the consumer intends to purchase a particular product or service), intent to visit (whether the consumer intends to visit a web site or physical store within a time period), brand recommendation (whether a consumer would recommend the brand to others), unaided awareness (whether a consumer, without prompting, lists one of the creatives when asked to list all advertisements he or she has seen in a particular category), or recall (whether a consumer lists a particular brand, product, or service when asked to list brands, products, or services in a particular category).

Surveys, such as those for brand favorability, intent to purchase, and brand recommendation may, for example, ask questions related to one or more of these responses, and ask the user to answer by selecting a number on a particular scale. For example, a survey may ask a user to rank, from 1 to 9, how favorably the user thinks about a particular brand. Responses above a certain number may be considered a positive consumer response, while responses below a certain number may be considered negative consumer responses (for example, responses of 8 and 9 may be considered positive responses).

Surveys for, for instance, for unaided awareness and recall may ask a user to list the advertisements, brands, products, or services in a particular category. Responses that include a creative in the campaign (unaided awareness), or a brand, product, or service that is the target of the campaign (recall) may be considered positive consumer responses, while those that don't are considered negative consumer responses.

Once the user answers the questions on the survey, the results are sent to the collection server 140, together, for example, with the campaign project identifier, the client identifier, and the exposure frequency parameter. The URL or other identifier for the web page from which the survey was served can also be included with the results. The collection server 140 records this information with, for instance, a time stamp of when the message was received and the IP address of the client system 110 from which the message was received. The collection server 140 aggregates this recorded information and stores this aggregated information in repository 144 as response data.

While the implementation described above initiates the survey using the beacon code that is part of the advertisement module that includes the creative shown, other implementations may initiate a survey from other advertisement modules or from the publisher or other web pages, or the surveys may be administered through other channels.

In another example, the beacon code 135b may include instructions to access a cookie exchange 160 prior to generating the beacon message. In this case, the beacon code 135b queries the cookie exchange 160 by providing unique identifying information of the client system 110, such as a particular IP address/user agent/time event. The cookie exchange 160 matches the provided information against their database 165 and, if available, returns any associated demographics. The beacon message is then sent to the collection server 140 with any demographics and cookie appended (and/or other unique identifier, such as an IP address/user agent combination) in addition to the web content URL. If the beacon message is received from the client system 110 without the cookie 208, then the collection server 140 may generate a unique identifier and include that identifier in a new cookie set on the client system 110. The collection server 140 records the web content URL, cookie/ID information, and demographics received in the beacon message with, for instance, a time stamp of when the beacon message was received. The collection server 140 aggregates this recorded information and stores this aggregated information in the database 144.

In another example, the client system 110 also may access a publisher or service provider 170 that results in some event for which a record with an associated timing event is created or recorded by the publisher/service provider 170. For example, access to the web server 171 of the publisher/service provider 170 by the browser 155 may require the user to login into or otherwise identify themselves to the web server 171. The publisher/service provider 170 generates information, such as a record of the user's activity including a time stamp of the activity. The information or record may be stored in a database 174 as part of user profile data 174a maintained for users of the publisher/service provider 170. The user profile data also may include demographic data (e.g., demographic data associated with a user's account or unique ID). In addition, the publisher/service provider 170 can download a profile cookie to the browser of the client system 110. The profile cookie may include the event time stamp and demographic data, among other things.

In one example, the beacon code 135b may include permissions to access the profile cookie. In this case, when the beacon code 135b is executed, a beacon message is generated in real time that also includes information from the profile cookie, such as the event time stamp and the demographics information. In another example, the beacon code 135b may include instructions to access the profile exchange 172 of the publisher/service provider 170 prior to generating the beacon message (e.g., if the client device does not include a profile cookie). In this case, the beacon code 135b queries the profile exchange 172 by providing a profile ID from the profile cookie or other unique identifying information, such as a particular IP address/user agent/time event. As with the cookie exchange, the profile exchange 172 attempts to match the information provided in the query with information in the database 174 and, if available, returns an event time (e.g., a login event time) and any associated demographics.

In any of these examples, the beacon message is sent to the collection server 140 with the profile or demographic information and event time (e.g., login time) included. The collection server 140 records the web content URL received in the beacon message with, for instance, a time stamp of when the beacon message was received and the IP address/user agent of the client system from which the beacon message was received along with the profile centric information. The collection server 140 aggregates this recorded information and stores this aggregated information in the database 144.

In another example, the collection server 140 may query the cookie exchange 160 or the profile exchange 172 (instead of the beacon code 135b as described above) after receiving the beacon message (e.g., that does not have any associated demographics). The query by the collection server 140 may be made in real time as the beacon message is received or at a later time, for example, as a query for a batch of beacon messages. For example, the collection server 140 can query the cookie exchange 160 by providing a time stamp of when a beacon message was received and unique identification, such as the IP address/user agent of the client system 110. The cookie exchange 160 attempts to match the provided information with information in their database 165 and, if available, returns any demographics associated with the information. The collection server 140 then assigns any demographic data to the appropriate beacon records, which include the web content URL received in the beacon message and the IP address/user agent of the client system 110. The collection server 140 aggregates this recorded information and stores this aggregated information in the database 144. Similarly, the collection server 130 also may query the profile exchange 172 by providing a time stamp of when a beacon message was received and the IP address/user agent of the client system 110. The profile exchange 172 attempts to match the provided information with information in the profile database 174 and, if available, returns any associated demographics and a time of an event (e.g., a login event). The collection server 140 then assigns any demographic data returned in response to the query with the appropriate beacon records, which include the web content URL received in the beacon message and the IP address/user agent of the client system. The collection server 140 aggregates this recorded information and stores this aggregated information in the database 144.

The demographic data associated with the beacon messages may be aggregated and normalized across different sources as described in U.S. patent application Ser. No. 13/834,550, filed Mar. 15, 2013, the entirety of which is incorporated by reference herein for all purposes.

As described in more detail below, the exposure data and the response data may be used to determine one or more effectiveness metrics regarding the effectiveness of the advertising campaign at achieving the desired consumer response. For instance, this data may be used to model the relative effectiveness of different creatives, different types of creatives, different web pages/websites, or different combinations of creatives and web pages/websites.

In another example, a panel of users may have monitoring applications installed on client systems of the users, and the monitoring applications are able to collect and report when a particular user or client system is exposed to a creative in the campaign, as well as actions taken by the users, such as visiting certain websites, searching for certain terms, or purchasing certain products from a web site. Thus, the panel may be used to obtain data regarding exposures to creatives that are part of the campaign as well as consumer responses. As another example, some of all of the data may be provided by a third party that collects such data. For instance, a third party may collect offline shopping data, which may be used to determine purchases.

FIG. 1C illustrates an example of a system 190 in which a panel of users may be used to collect data for Internet audience measurement. The system 190 includes client systems 182, 184, 186, and 188, one or more web servers 120, the collection server 140, and a database 144. In general, the users in the panel employ client systems 182, 184, 186, and 188 to access resources on the Internet, such as web pages located at the web servers 120. Information about this resource access is sent by each client system 182, 184, 186, and 188 to a collection server 140. This information may be used to understand the usage habits of the users of the Internet.

Each of the client systems 182, 184, 186, and 188, the collection server 140, and the web servers 120 may be implemented using, for example, a processing device, such as a general-purpose computer capable of responding to and executing instructions in a defined manner, a personal computer, a special-purpose computer, a workstation, a server, a microprocessor, or a mobile device. Client systems 182, 184, 186, and 188, collection server 140, and web servers 120 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a client system 182, 184, 186, and 188, collection server 140, and web servers 120.

In the example shown in FIG. 1C, the system 190 includes client systems 182, 184, 186, and 188. However, in other implementations, there may be more or fewer client systems. Similarly, in the example shown in FIG. 1C, there is a single collection server 140. However, in other implementations there may be more than one collection server 140. For example, each of the client systems 182, 184, 186, and 188 may send data to more than one collection server for redundancy. In other implementations, the client systems 182, 184, 186, and 188 may send data to different collection servers, for example, based volume of users, resources, load handling/balancing, and/or for other reasons, such as geography or network topology. In this implementation, the data, which represents data from the entire panel, may be communicated to and aggregated at a central location for later processing. The central location may be one of the collection servers.

The users of the client systems 182, 184, 186, and 188 are a group of users that are a representative sample of the larger universe being measured, such as the universe of all Internet users or all Internet users in a geographic region. To understand the overall behavior of the universe being measured, the behavior from this sample is projected to the universe being measured. The size of the universe being measured and/or the demographic composition of that universe may be obtained, for example, using independent measurements or studies. For example, enumeration studies may be conducted monthly (or at other intervals) using random digit dialing.

Similarly, the client systems 182, 184, 186, and 188 are a group of client systems that are a representative sample of the larger universe of client systems being used to access resources on the Internet. As a result, the behavior on a machine basis, rather than person basis, can also be, additionally or alternatively, projected to the universe of all client systems accessing resources on the Internet. The total universe of such client systems may also be determined, for example, using independent measurements or studies The users in the panel may be recruited by an entity controlling the collection server 140, and the entity may collect various demographic information regarding the users in the panel, such as age, sex, household size, household composition, geographic region, number of client systems, and household income. The techniques used to recruit users may be chosen or developed to help insure that a good random sample of the universe being measured is obtained, biases in the sample are minimized, and the highest manageable cooperation rates are achieved. Once a user is recruited, a monitoring application is installed on the user's client system. The monitoring application collects the information about the user's use of the client system to access resources on the Internet and sends that information to the collection server 140.

For example, the monitoring application may have access to the network stack of the client system on which the monitoring application is installed. The monitoring application may monitor network traffic to analyze and collect information regarding requests for resources sent from the client system and subsequent responses. For instance, the monitoring application may analyze and collect information regarding HTTP requests and subsequent HTTP responses.

Thus, in system 190, a monitoring application 182*b*, 184*b*, 186*b*, and 188*b*, also referred to as a panel application, is installed on each of the client systems 182, 184, 186, and 188. Accordingly, when a user of one of the client systems 182, 184, 186, or 188 employs, for example, a browser application 182*a*, 184*a*, 186*a*, or 188*a* to visit and view web pages, information about these visits may be collected and sent to the collection server 140 by the monitoring application 182*b*, 184*b*, 186*b*, and 188*b*. For instance, the monitoring application may collect and send to the collection server 140 the URLs of web pages or other resources accessed, the times those pages or resources were accessed, and an identifier associated with the particular client system on which the monitoring application is installed (which may be associated with the demographic information collected regarding the user or users of that client system). For example, a unique identifier may be generated and associated with the particular copy of the monitoring application installed on the client system. The monitoring application also may collect and send information about the requests for resources and subsequent responses. For example, the monitoring application may collect the cookies sent in requests and/or received in the responses. The collection server 140 receives and records this information. The collection server 140 aggregates the recorded information from the client systems and stores this aggregated information in the database 144 as panel centric data 192*a*.

The panel centric data 192*a* may be analyzed to determine the visitation or other habits of users in the panel, which may be extrapolated to the larger population of all Internet users. The information collected during a particular usage period (session) can be associated with a particular user of the client system (and/or his or her demographics) that is believed or known to be using the client system during that time period. For example, the monitoring application may require the user to identify his or herself, or techniques such as those described in U.S. Patent Application No. 2004-0019518 or U.S. Pat. No. 7,260,837, both incorporated herein by reference, may be used. Identifying the individual using the client system may allow the usage information to be determined and extrapolated on a per person basis, rather than a per machine basis. In other words, doing so allows the measurements taken to be attributable to individuals across machines within households, rather than to the machines themselves.

As described further below, the cookie based, the panel centric, the survey based, third party data can be used below to generate a model that indicates the effectiveness of different elements of an advertising campaign. As described above, panel centric data 192*a* can indicate the history of exposures to creatives experienced by members of the panel and the behavior of members of the panel (e.g., web page/website usage, clicks on advertisements, and searches performed) correlated to those exposure histories. Thus the panel centric data 192*a* can be used in place of cookie based, exposure history and survey response data collected as described with respect to FIG. 1A. As an alternative, panel centric data 192*a* can be used to supplement the survey response data collected from users who are not members of the panel. For example, the survey response data may be used to generate some parameters of an advertising effectiveness model, and panel centric data 192*a* can be used to calibrate the generated model for a population of users with demographic characteristics different from those of the surveyed users.

To extrapolate the usage of the panel members to the larger universe being measured, some or all of the members of the panel are weighted and projected to the larger universe. In some implementations, a subset of all of the members of the panel may be weighted and projected. For instance, analysis of the received data may indicate that the data collected from some members of the panel may be unreliable. Those members may be excluded from reporting and, hence, from being weighted and projected.

The reporting sample of users (those included in the weighting and projection) are weighted to insure that the reporting sample reflects the demographic composition of the universe of users to be measured, and this weighted sample is projected to the universe of all users. This may be accomplished by determining a projection weight for each member of the reporting sample and applying that projection weight to the usage of that member. Similarly, a reporting sample of client systems may be projected to the universe of all client systems by applying client system projection weights to the usage of the client systems. The client system projection weights are generally different from the user projection weights.

The usage behavior of the weighted and projected sample (either user or client system) may then be considered a representative portrayal of the behavior of the defined universe (either user or client system, respectively). Behavioral patterns observed in the weighted, projected sample may be assumed to reflect behavioral patterns in the universe.

Estimates of visitation or other behavior can be generated from this information. For example, this data may be used to estimate the number of unique visitors (or client systems) visiting certain web pages or groups of web pages, or unique visitors within a particular demographic visiting certain web pages or groups of web pages. This data may also be used to determine other estimates, such as the frequency of usage per user (or client system), average number of pages viewed per user (or client system), and average number of minutes spent per user (or client system).

Such estimates and/or other information determined from the panel centric data may be used with data from a beacon-based approach, as described above, to generate reports about audience visitation or other activity. Using the panel centric data 192a with data from a beacon-based approach may improve the overall accuracy of such reports. Nevertheless, a beacon-based approach is not required to collect the panel centric data 192a. In addition, because of the detail of reporting provided by panel users, the panel may be used to select a control group of users who are not exposed to the advertising campaign from lift can be measured as explained below.

The system and methods described herein with regard to collection of user information, such as, for example, cookie, survey, panel, and demographic data abide by well established website, publisher, and web services privacy policies. Collection and use of panel, survey, and some demographic data require consent of the user. Other data collection may be performed by allowing users to opt-in for collection and use of this information. With regard to cookies, users have the ability to control use of and/or access to cookies on their systems. In addition, reference to uniquely identifying an entity, an individual, or a machine with regard to collecting information typically means trying to determine whether actions or information are attributable to one or more different sources so that better use or analysis of the information can be made, and not trying to determine the actual identity or other personal identifying information of the source, such as a name (e.g., John Smith), unless permission by an individual is specifically given to use and/or gather the actual identity or other personal identifying information.

Determining Lift and Modeling

The system and processes described herein use action lift attribution and an automated statistical modeling approach to measure the effects of digital advertising on online, behavior based events, such as a brand specific site visit. The system estimates, among other things, the relative and absolute impact of one or more specified segments. Examples of segments include a publisher or a publisher type; a creative including placements, type, format, and size; media channels, such as digital, mobile, TV, or radio; demographic groups; client-defined segments; tested for statistical significance.

The automated lift attribution model builds a multivariate statistical regression model with all attributes for an advertising impression in the model using an entire data set of impressions. However, the outcome variables of interest, such as visiting a website are behavior based, and, as such, have a temporal element to them. For example, an advertiser might like to know how a digital impression drives traffic to their site over a set period of time. In essence, an advertiser wants to know how prior impressions impact future behaviors. To ensure that the correlation seen between an impression that is served and a corresponding site visit can be inferred to be causative, the data can be aligned to measure a defined prior time period of impressions versus a future time period of actions (e.g., site visits). From the modeling perspective, that means for each model built, the clock is stopped and prior window of impressions served and a behavior made is measured against a future behavior. Given these constraints, to capture the most out of the data, the methodology described below employs a rolling analysis. For each discrete time unit (e.g., a day), a model is built and summary metrics are taken. The results of the rolling analysis can then be rolled up to or determined for other time periods, such weekly, monthly, or campaign levels.

General parameters of the model are specified. For example, a pre-period window length, a post period window length, the measurement frequency (how often the analysis is performed), and a recency scalar (a weight that may be applied to adjust for length of the time between the exposure and the point in time for which the analysis is being performed) are variables and general parameters that are specified for the model. In one example, the pre-period window length may be set (e.g., 45 days) to measure exposures (e.g., impressions), the post window length may be set (e.g., 28 days) to measure an action or behavior (e.g., purchases), the measurement frequency (e.g., daily) may be set for how often to run the analysis, and a recency scalar (e.g., 0.95) may be set to adjust for length of the time between the exposure and the point in time for which the analysis is being performed.

The data set for analysis associated with the creative or campaign is processed to place the exposure data into a format that facilitates analysis by the model. A preparation function may be used to create the model ready data (e.g., a file). For a given day, the function aggregates all prior impressions, applies the recency scalar to down-weight older impressions, and aggregates all prior and future behaviors for the entire static data sample set. The end result is a data set (e.g., a file) with one row per unique Machine Identifier (ID), with all prior impressions, behaviors, and future actions. In one example, an SQL script creates one row per a unique entity identification (ID) (e.g., a machine ID) per time unit of the prior exposures; demographic variables (e.g., age, gender, income, household size, etc.); aggregates prior behaviors (e.g., total internet usage, brand searches, site visits, prior purchases) provided from one or more SQL databases; and aggregates the future behaviors (e.g., brand searches, site visits, prior purchases).

Figure 2:
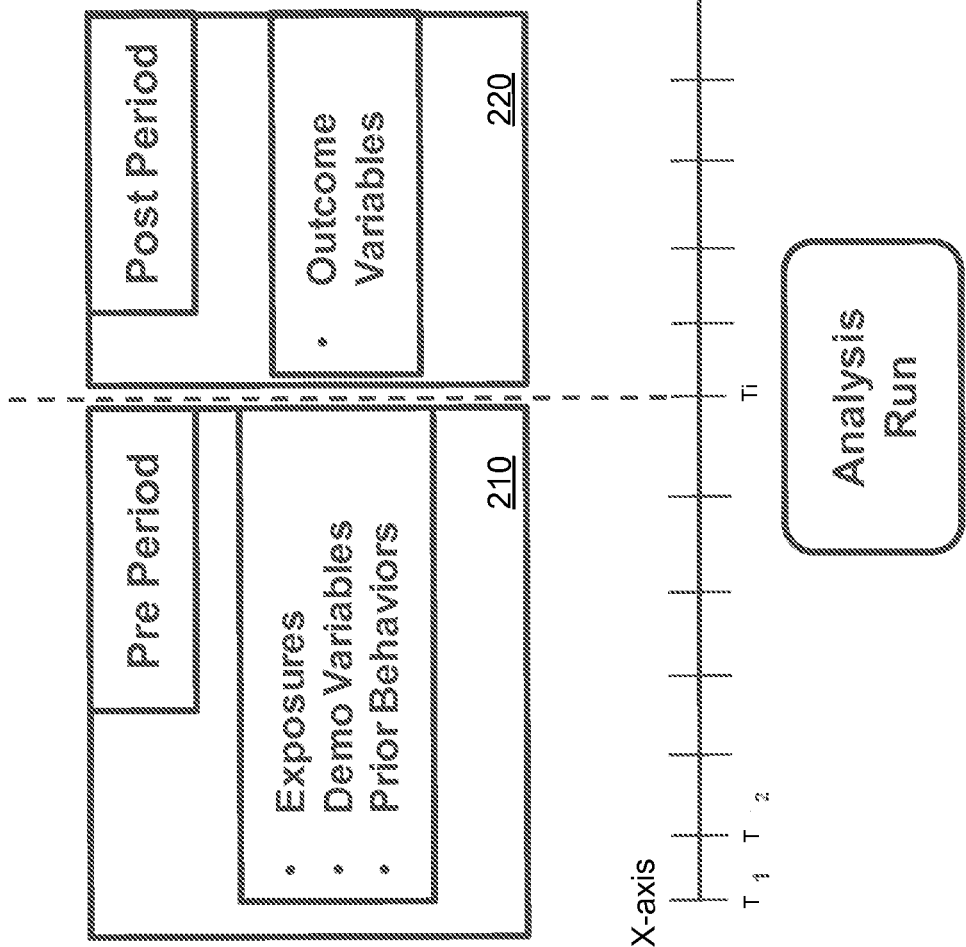
FIG. 2 illustrates an example of a temporal aspect of modeling.

FIG. 2 illustrates an example 200 of a temporal aspect and rolling analysis of the automated modeling used by the system. As shown in FIG. 2, an x axis 201 shows time in discrete units T. In one example, T may be measured in days; however, other time units may be used. For a set of data for some uniquely identifiable entities, for example, a user, a client machine, or combination thereof, that has already been obtained, a pre-period window of time 210 and a post period window of time 220 are determined. The pre-period window and post-period window may be measured in discrete units of time, for example, days, weeks, or months. The pre-period window is used to aggregate certain aspects of the user data prior to a particular discrete time T on the x-axis. The post-period window is selected as a window of opportunity for a specified action or user behavior to take place after the discrete time T. As shown in FIG. 2, the pre-period and post period may have different lengths around the discrete time T. In addition, different period window lengths may be chosen based different type of behaviors associated with a creative or campaign. For example, a different post period window length may be chosen for a pet food product versus a candy bar product given the vastly different purchase cycles of these products.

For the set of pre-formatted exposure data, analysis is run for an initial time $T_i$ from which the pre-period and post-period windows are measured. For each discrete time unit (e.g., a day), a model is built and summary metrics are taken. Because the post period is typically shorter in duration than an entire campaign, the analysis is rolled forward and performed for each discrete $T_1+1$ to provide a rolled up analysis, for example, weekly, monthly, quarterly, or until the end of the campaign for different analysis run periods.

The attribution modeling uses a General Linear Model framework where the appropriate loss family is matched to the outcome measure. For Binary variables with yes, no outcomes a Binomial Loss Function with a Logit Link is used. For count variables such as number of visits a Poisson Loss Function with a log link is used with an additional parameter for over dispersion. For positive continuous variables such as number of minutes consumed or dollars spent a Loss Function is used with a log link and a variance parameter a function of the mean. The model is generally additive and measures an expected response for an entire frequency curve. One of several approaches may be used to measure frequency, one of which is the bucket approach, and is described below. A simpler, baseline approach may be used that transforms the measured frequency with the logarithmic function and is then model directly.

The automated model can estimate the impact of advertising on the likelihood that an event occurs in the corresponding post period. In one example, the model converts outcome metrics to binary (0 or 1). All exposure buckets are model jointly and the model estimates independent effects of each exposure bucket. The exposure buckets are transformed into categorical variables, for example, frequency buckets={0, 0-1, 1-2, 2-5, 5-10, 10-25, 25-100, 100+}. Buckets may be chosen based on a minimum sample, advertiser feedback, and/or an impression breakdown, which allows for non-linear patterns to emerge. A separate estimate is made for a control group. In addition, controls may be put in place for high exposure levels that might otherwise distort outcome metrics (e.g., a machine that is left on and unattended that created a distorted number of frequency of hits). Metrics are determined per exposure bucket. Lift is determined as the difference between the control group and exposure type and frequency level. Lift can be <0 and there are no model constraints on variable selection. Lift % is the lift over the control group. LogOdds: $e^{\beta_i}$ measures the effectiveness metric that controls for impression volume. The overall level of significances is a likelihood ratio test of all frequency levels. The bin level is a two sample t-test against the control. The model estimates the relative and absolute impact of each segment entity (e.g., segments can be defined as: publisher or publisher type; creative placements, type, format, size, etc., demographic groups, advertiser-defined segments; and tested for statistical significance). In one example, the output is able to show both absolute vs. relative lift metrics and as a result provides optimal frequency insights that are not provided by traditional test and control analysis.

Figure 3:
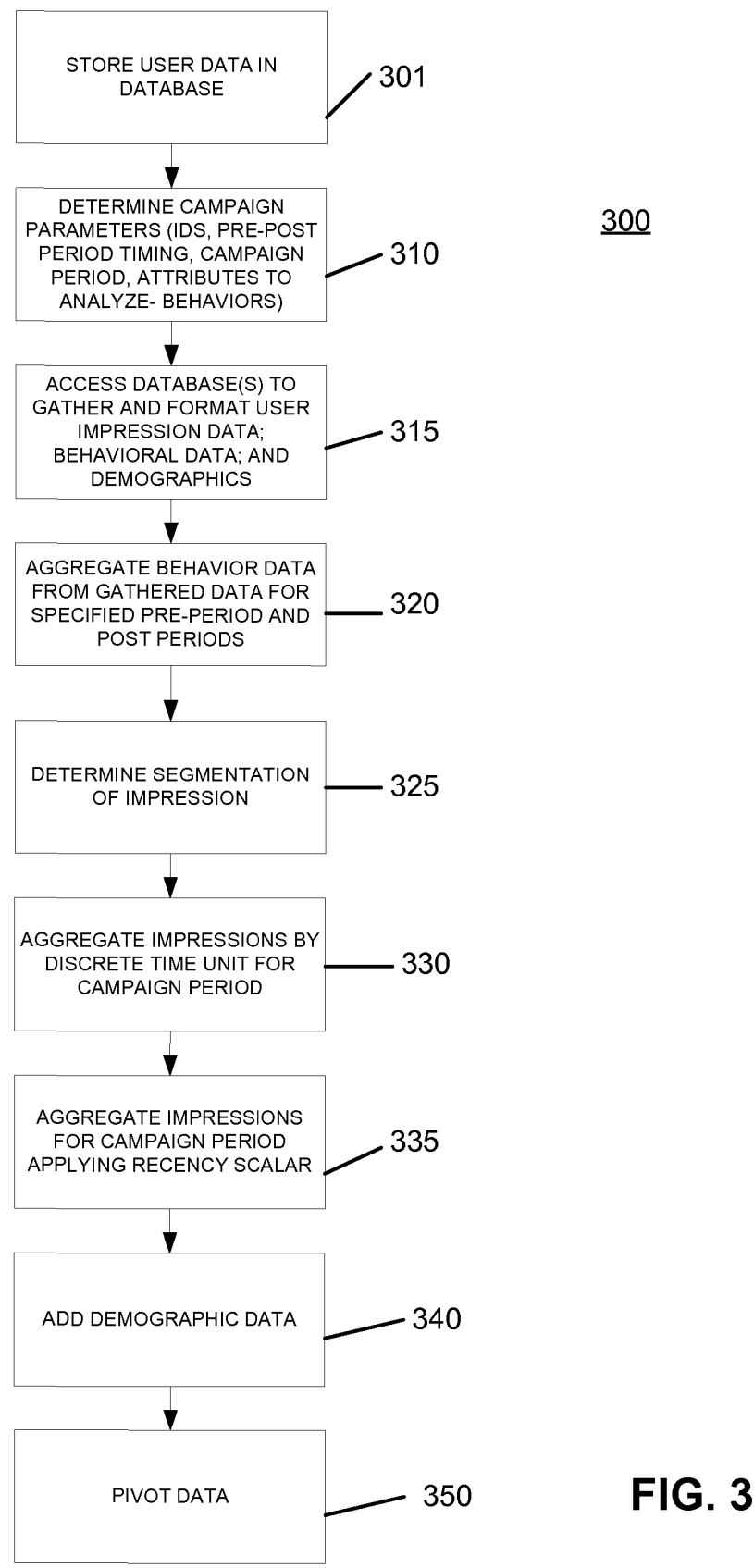
FIG. 3 is a flow chart illustrating an example of a process for aggregation of the data sample for the model processing.

FIG. 3 is a flow chart illustrating an example of a process for aggregation of the data sample for the model processing.

The user data (e.g., panel centric data, cookie data, census data, and demographic data) may be collected from any number of data sources as described above with regard to FIGS. 1A-1C and stored in one or more databases (301). In one example, the database may be an SQL database.

The system then determines the campaign parameters (310). For example, the parameters such as advertiser IDs, campaign IDs, pre period timing, post period timing, a campaign or run period (e.g., a start date and end date), and the attributes to analyze (e.g., defining variables for the analysis, such as the desired outcomes/behaviors and the desired impression cuts) may be input or otherwise determined by the system for the dataset that is to be analyzed.

The system accesses the one or more databases to gather and format user impression data; behavioral data; and demographics for aggregation (315). The system accesses one or more databases (e.g., warehouses of data that has been collected for users) and pulls out the data that is relevant to the parameters specified in step 310. The system extracts the data based on the parameters for a given study and writes the data to a storage device in the specified format, such as a file (e.g., a flat file) that is formatted, ordered, and delimited for use by the system to perform the aggregation described below.

For behavioral data aggregation, the system aggregates the behavior data from gathered data for the specified pre-period and post periods (320). For each individual or unique ID, the system aggregates each specified metric from step 310 for each discrete time unit of the campaign (e.g., daily) for the pre-period. For example, the system aggregates each metric (e.g., behavior) to each day of the campaign period, and sums the metric for all days between aggregation dates of pre period length (e.g., 30 days) (i.e., the period of time between the aggregation date and the date equal to the aggregation date minus the pre-period). Similarly, for each individual or unique ID, the system aggregates each specified metric from step 310 for each discrete time unit of the campaign (e.g., daily) for the post-period. For example, the system aggregates each metric to each day of the campaign or run period, and sums the metric (e.g., the behavioral outcomes) for all days between the aggregation date plus one (+1) and aggregation date plus the post period length (e.g., 30 days). The aggregations may be done for both binary and continuous outcomes. For example, a binary outcome indicates one of two possible states, such as for example, website visit/no website visit. A continuous outcome indicates continuous actions, such as for example, minutes spent on website).

For impression data aggregation, the system determines the segmentation of impressions (325), aggregates the impressions by discrete time unit for campaign period (330), and aggregates the impressions for campaign period applying a recency scalar (335). The system determines how to segment the impressions (e.g., creatives vs. placements, publishers, etc.) based on the input parameters in step 310. The system aggregates the impressions by bucket for each day of the campaign period, and sums the impressions for all days between the aggregation date minus a time period (e.g., 45 days) and aggregation date. The system also aggregates impressions by bucket to each day of the campaign period, and applies a recency scalar (0.95^(diff between the aggregation date and date of impression), and sums recency applied impression counts for all days between the aggregation date minus a predetermined period (e.g., 45 days) and the aggregation date. The recency scalar is used to diminish or down weight the impact of an impression the older the impression is relative to the analysis date. In this case, 0.95 is used to provide a half life of two weeks (i.e. the weight of an impression after two is half of what it is today).

The system adds demographic data (340) to the data set to create one table (e.g., one row for each machine, day, and metric). In one example, SQL scripts may be used to create each row of the table, for example, one row per unique ID (e.g., machine ID) per time unit of the prior exposures (e.g., impressions), demographic variables (e.g., age, gender, income, household size, etc.), prior behaviors (e.g., total internet usage, brand searches, site visits, prior purchases) with aggregation of the future behaviors (e.g., brand searches, site visits, prior purchases) all provided from a SQL database.

Finally, the system can perform a pivot of the accessed data set (350). For example, the system can pivot the data to form one row per machine/day combo instead of having one row per machine/day/metric (i.e., metrics, impressions, and demo values become columns instead of rows). This allows the data to be exported as one file that includes all discrete time units (e.g., days).

Figure 4:
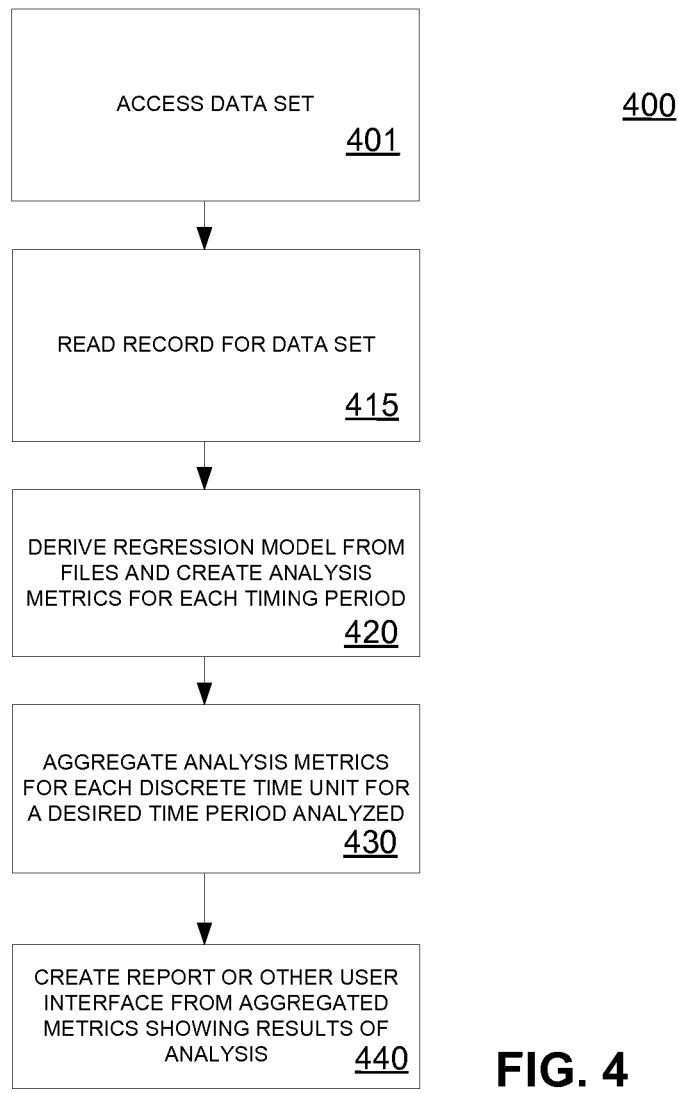
FIG. 4 is a flow chart illustrating an example of a process for determining an advertising effectiveness metric for one or more advertising campaigns.

FIG. 4 is a flow chart illustrating an example of a process for determining an advertising effectiveness metric for one or more advertising campaigns.

The system accesses the data set from step 350 (401). The system then creates a file or data record for each discrete time unit (e.g., day) of the table data set for use by the modeling function (415).

The system derives a regression model from the files to create analysis metrics for each discrete time unit (420). The attribution modeling uses a General Linear Model with Binomial Loss Function and Logit Link and frequency bucket factors. The model measures the expected response for the entire frequency curve. The methodology has developed a few approaches to measuring frequency one of which is the bucket approach described below. A simpler, baseline approach is to transform the frequency with the logarithmic function and model directly. The model is generally additive. The model estimates the impact of advertising on the likelihood that an event will occur in the corresponding post period. In one example, the model converts outcome metrics to binary (0 or 1). All exposure buckets are modeled jointly and the model estimates independent effects of each exposure bucket. The exposure buckets are transformed into categorical variables, for example, Frequency buckets={0, 0-1, 1-2, 2-5, 5-10, 10-25, 25-100, 100+}. Buckets may be chosen based on a minimum sample, advertiser feedback, and impression breakdown, which allows for non-linear patterns to emerge. In addition, controls may be put in place for high exposure levels that might otherwise distort outcome metrics (e.g., a machine that is left on and unattended that creates a distorted number or frequency of hits). A separate estimate is made for the control group. Metrics are determined per exposure bucket.

Lift is determined as the difference between the control group and exposure type and frequency level. Lift can be <0 and there are no model constraints on variable selection. Lift % is the lift over the control group. LogOdds: measures the effectiveness metric that controls for impression volume. The overall level of significance is a likelihood ratio test of all frequency levels. The bucket level is a two sample t-test against the control. The model estimates the relative and absolute impact of each segment entity (e.g., segments can be defined as: a publisher or a publisher type; creative placements, type, format, size, etc., demographic groups; advertiser-defined segments; and tested for statistical significance). The steps of the automated modeling function are described in further detail below with reference to FIG. 5.

The system aggregates the metrics output from the modeling functions for each discrete time unit of the campaign or desired run length (430).

The system creates a report or other user interface showing results of analysis from the aggregated metrics (440), for example, a number of reports and interface is shown in FIGS. 7-11 below.

Figure 5:
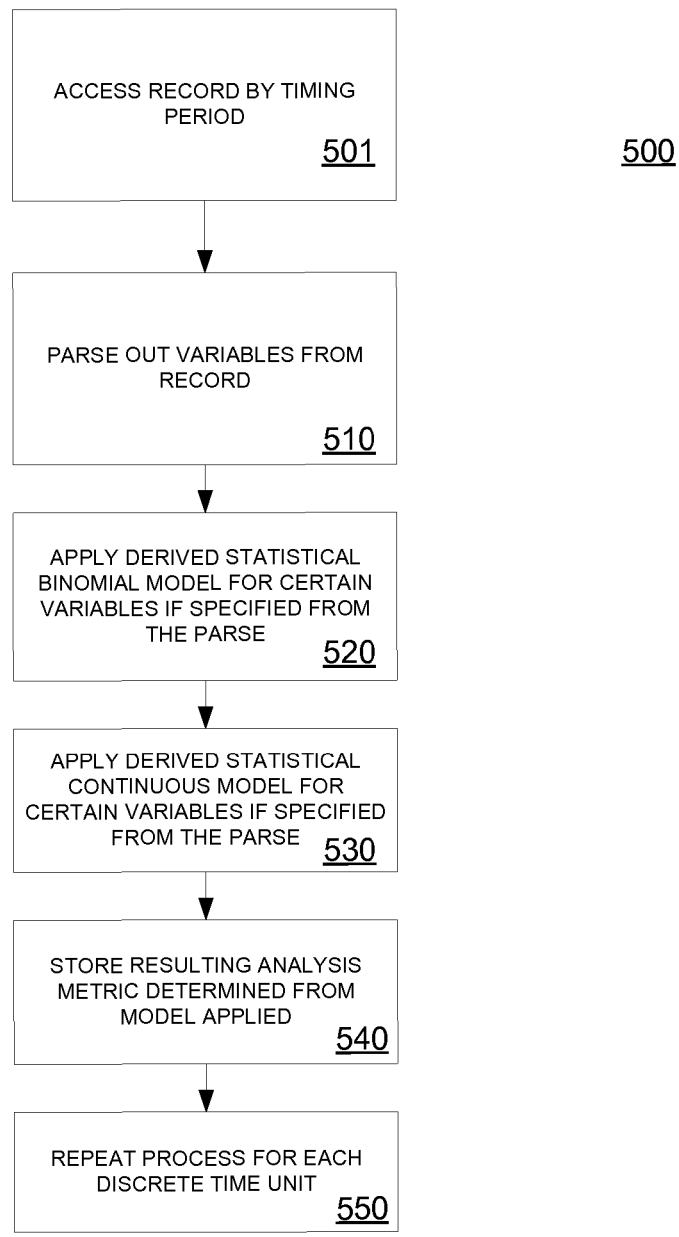
FIG. 5 is a flow chart illustrating an example of a process of a modeling function for determining an advertising effectiveness metric for one or more advertising campaigns.

FIG. 5 is a flow chart illustrating an example of a process for a modeling function for determining an advertising effectiveness metric for one or more advertising campaigns. Generally, the process shown may be implemented as step 420 in FIG. 4.

The system accesses data from the records by timing period (501). The system then creates a file or data record for each discrete time unit (e.g., day) of the table data set for use by the modeling functions. The record may be processed by an R script, for example.

The system automatically parses out variables from the accessed data from the record (510). For example, the system can analyze the column headings of the data record to determine the variables for which the modeling is to be performed, determine the type of variable, and determine what type of regression modeling function is to be applied to the data. In one example, five basic variable types are gross impression variables, time adjusted variables, outcome variables (i.e., future behavior outcomes, such as visiting a website); balancing variables (i.e., past behavior outcomes), and demographic variables. In one example, an R script reads in data and parses out the variables from column header schema.

For example, if the data is:
OUT_BIN_ADV_SITE_1_PGS: 22 27 50 54 59 80

The system can determine this is an outcome variable (i.e., OUT), it is binary (i.e., BIN) for a visit to the first pages of advertisers website (i.e., ADV_SITE_1_PGS). Other examples, can include "DEMO" for a demographic variable and "IMP" for an impression variable to name but a few, Once the variables are set, the system applies regression analysis for the variables using one of two modeling functions to determine each desired metric (e.g., Lift or % Lift): a binomial model or continuous model. In one example, an R script runs the appropriate statistical model based on header schema.

For example, using the example provided above the "BIN" tag identifies a binomial variable indicating use of a binomial model. In another example a "CONT" tag identifies a continuous model.

The system applies a statistical binomial model for certain variables if specified from the parse (520). In one example, a Logistic Model is run for binary outcome actions (site visit/no site visit).

The system applies statistical continuous model for certain variables if specified from the parse (530). In one example, a Poisson Model with over-dispersion metric for zero bounded continuous actions (e.g., minutes spent on site) is used.

The system stores the resulting analysis metrics determined by the model applied for each desired segment and discrete time unit (540). Metrics are taken for each impression segment at a discrete time unit for which a metric is desired. Lift is determined as the difference in the expected outcome of those exposed from those not exposed. Lift percent is the difference in the expected outcome of those exposed from those not exposed divided by the expected outcome of those not exposed. An effect metric is the coefficient taken from model. The binary model uses an exponent transform for log ratio inference. The continuous model may be used as is or use an exponent transform to represent the percent change. The p-value from the model also is measured to assess the statistical significance of the weights for coefficients each of the exposure variables, as well as a confidence interval to express the error implicit in the analysis.

The system can repeat the process (510-540) for each discrete time unit to determine metrics rolled forward for a desired timing period for analysis (550). In other words, metrics may be determined to cover a weekly, monthly, quarterly, yearly or other campaigned period for which analysis is desired.

Figure 6:
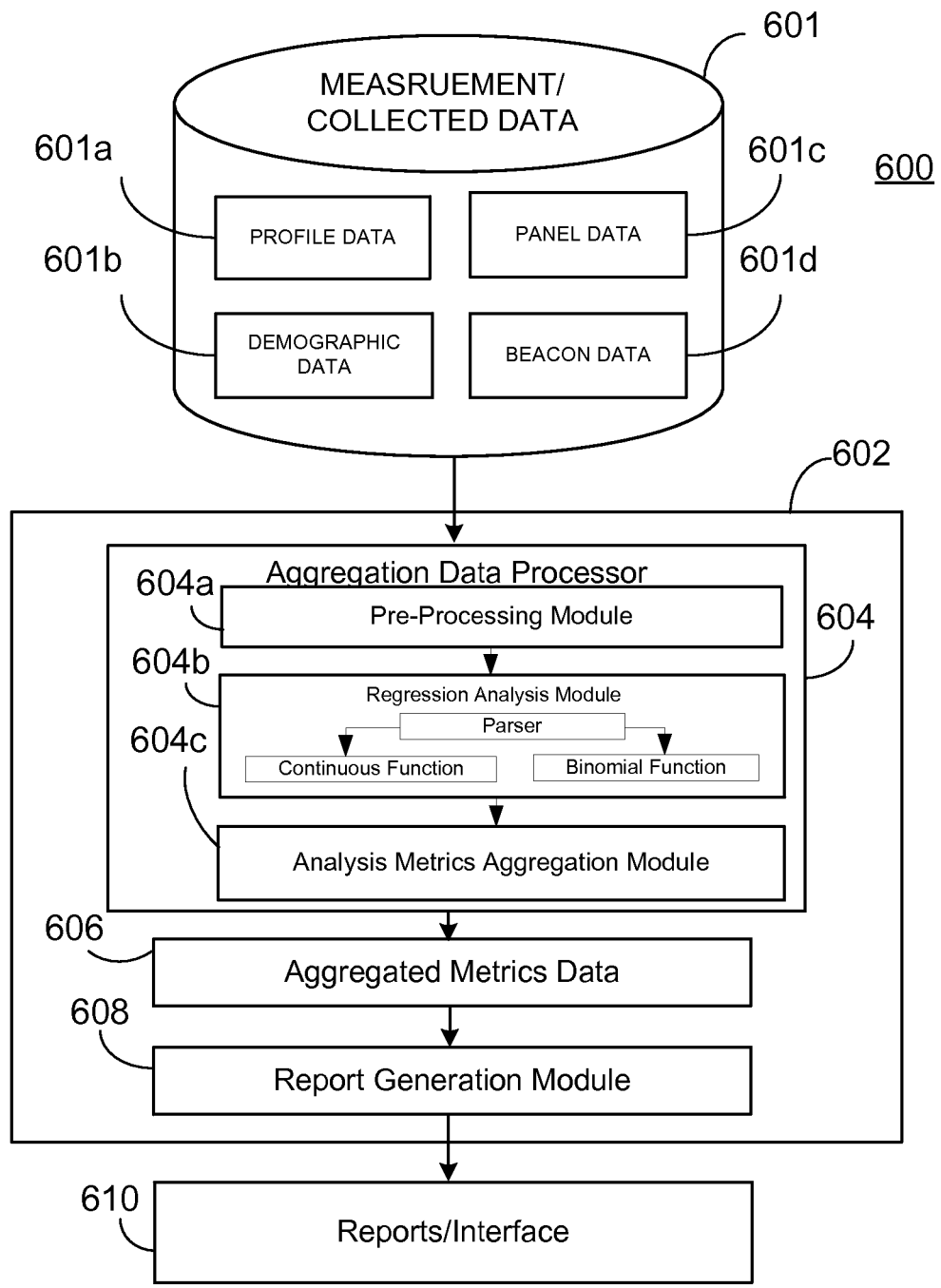
FIG. 6 illustrates an example of a system configured to implement metric data aggregation, analysis and reporting and processes illustrated in FIGS. 3, 4, and 5.

FIG. 6 illustrates an example of a system 600 configured to implement metric data aggregation, analysis and reporting. The system 600 uses the collected panel data 601a, demographic data 601b, beacon data 601c, and profile/census data 601d stored in the database 601 to perform the regression analysis to determine relative and absolute impacts for campaign metrics. In one example, the database may be a SQL database. The data is shown as being stored by a single database 601 for simplicity of explanation; however, it will be appreciated that the data may be stored and accessed from multiple storage locations and databases.

The system 600 includes a data processor/server 602. The aggregation server 602 may be implemented using, for example, a general-purpose or special-purpose computer, such as a personal computer, a workstation, or any processing device capable of responding to and executing instructions in a defined manner. The processor/server 602 receives instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the processor/server 602.

The processor/server 602 executes instructions that implement an aggregation data processor 604 and a report generation module 608. The aggregation data processor 604 includes a pre-processing module 604a, an regression analysis module 604b, and a analysis metric aggregation module 604c. The aggregation data processor 604 may include applications operative and configured to implement the processes, such as those shown in FIGS. 3, 4, and 5 to generate daily aggregated metrics data 606 based on the panel data 601a, demographic data 601b, beacon data 601c, and profile/census data 601d. The pre-processing module 604a, accesses and processes the data (e.g., panel data 601a, demographic data 601b, beacon data 601c, and profile/census data 601d) to place the data in a format for use by the regression analysis module 604b using for example the methods described in FIG. 3. The regression analysis module 604b uses the pre-processed data to perform the regression modeling processes of 5 to determine the analysis metrics for discrete time units (e.g., daily) aggregated by the analysis metric aggregation module 604c over a time period (e.g., a campaign) to generate the aggregated metrics data. The report generation module 608 may use the aggregated metrics data 606 to generate one or more reports for a user interface 610

The reports may be generated by the report general module 608 in any number of forms from spread sheets to sophisticated automated, interactive user interfaces (e.g., dashboards) that allow a user to manipulate the demographic distribution data, such as those shown in FIGS. 7-11 and described below.

Output, Metric Presentation, Reporting & User Interface

Figure 7:
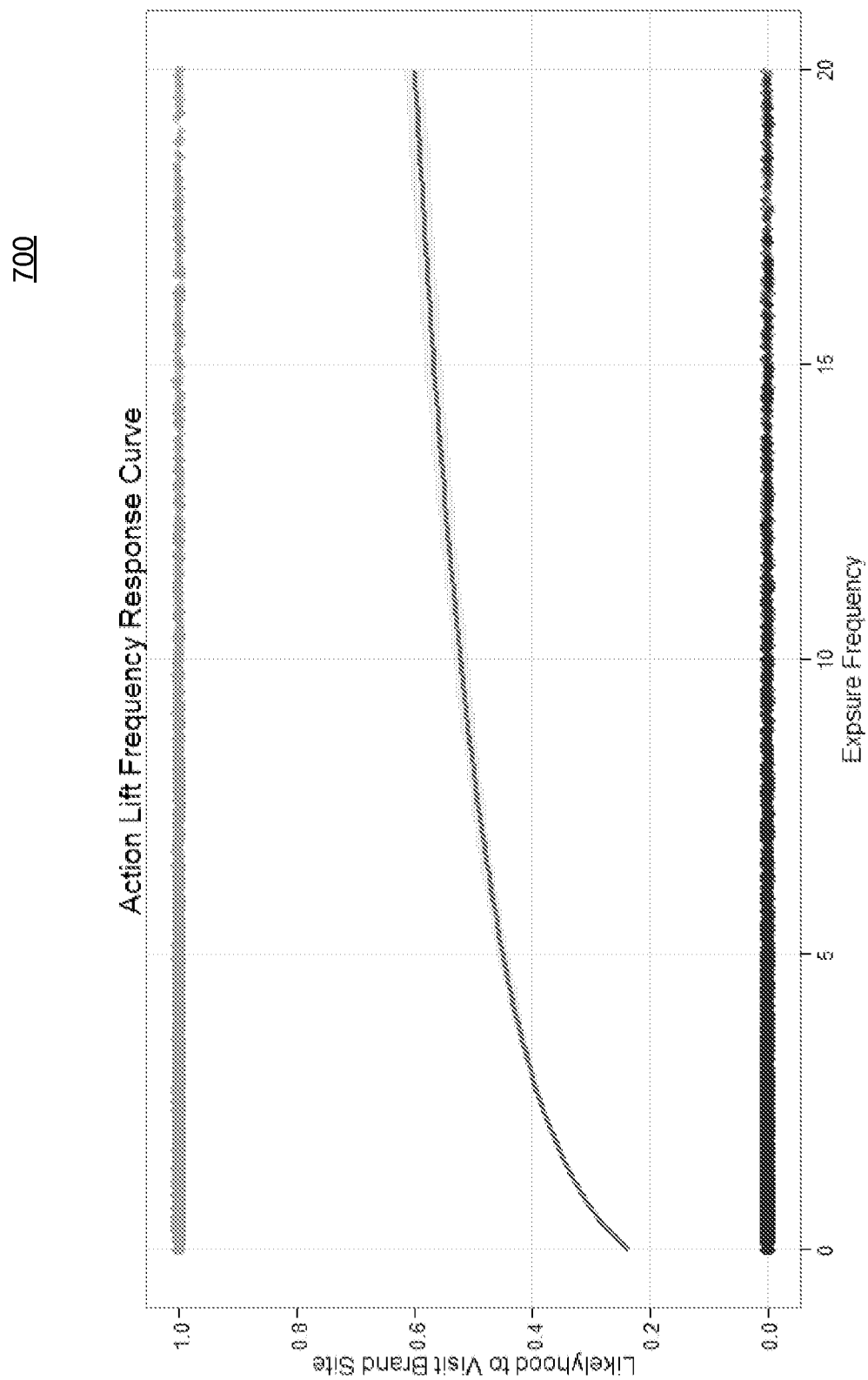
FIG. 7 illustrates an example of a behavior lift frequency response curve generated by the system.

FIG. 7 illustrates an example 700 of a behavior lift frequency response curve. FIG. 7 shows plot of the exposure frequency on the x-axis by a binary outcome of a brand site visit on the y-axis for each unique ID. The plot overlays the likelihood of a visit to a brand site based on exposure frequency. As can be seen from this figure the likelihood of a visit to a brand site increases with exposure frequency to a certain point and then begins to flatten. Traditional test and control methodology can be problematic with high reach campaigns where a control group is limited and is stretched too far. Furthermore, traditional test and control does not take frequency of exposures into account. However, unlike traditional test methods, the lift attribution model is able to use the entire frequency curve to estimate response rates as shown in FIG. 7.

Figure 8:
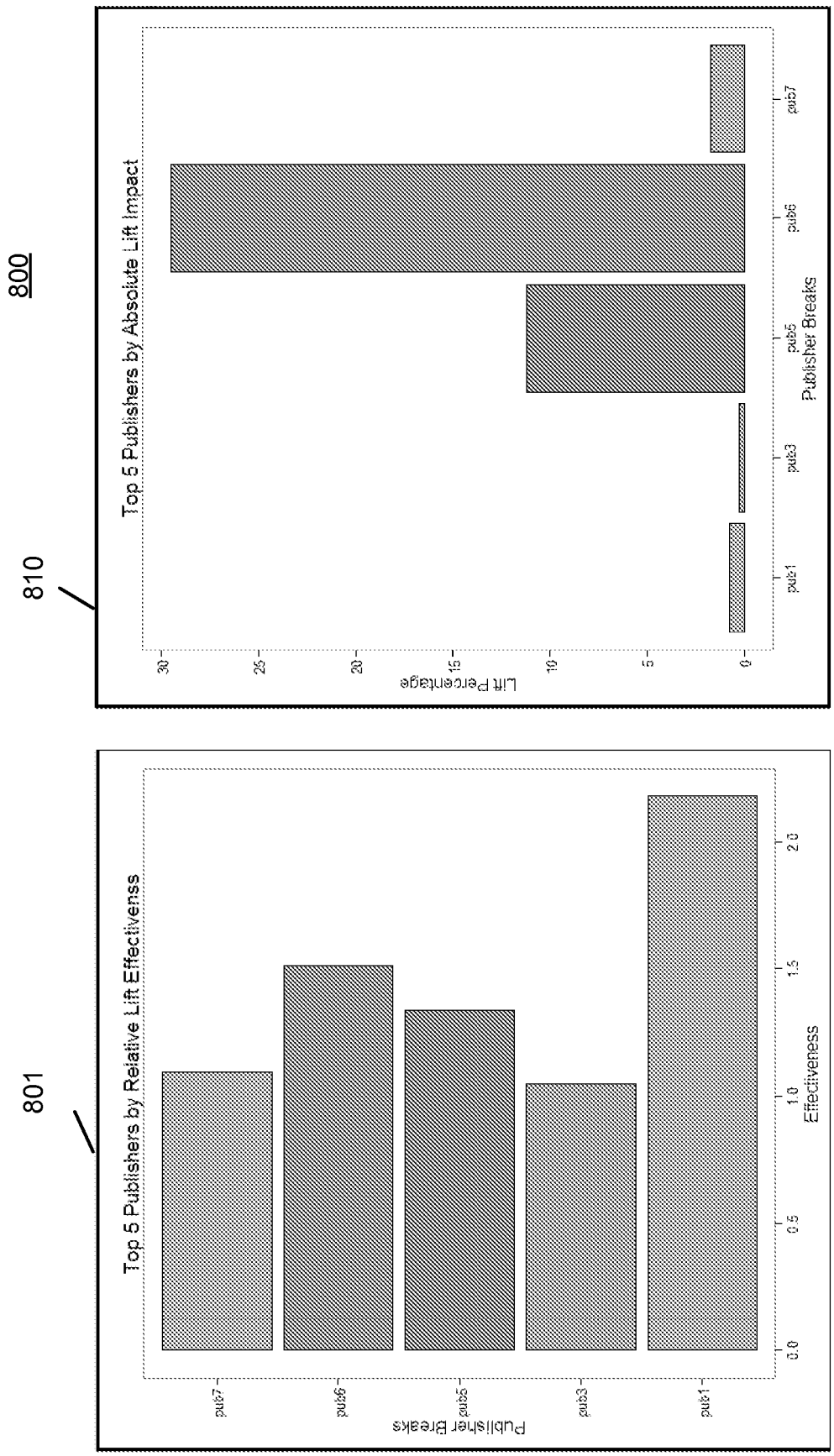
FIG. 8 shows examples of bar graphs generated by the system illustrating relative and absolute impacts.

FIG. 8 shows bar graphs illustrating examples of outputs of the attribution lift model that can provide indications of the relative and absolute impacts of a campaign. Traditional test and control methodology does not measure independent effects of advertising elements. However, the system provided herein applying the lift attribution model estimates the relative and absolute advertising exposure impacts independent of other advertising exposures, and controls for demographics because a statistical regression model is used to parse out independent effects of each advertising component. For example, the graphs 801 and 810 show output at a publisher level breakout. As shown in graph 810, the top five publishers are shown by their absolute impact as a percentage of the lift they give. However, the model is also able to provide the top five publishers by their relative lift effectiveness in graph 801, and as a result provide insights that might be missed by traditional test and control analysis. In this example, to understand how publishers are driving traffic, the exposure variables are segmented by publisher and then aggregated by each of the publishers to determine different weights for each of the publishers measured from the exposure data. The weights received from the regression analysis are relative because the weights are on the same unit scale for all the different publishers. As shown in FIG. 8, the absolute lift is largest for publisher 6. However, publisher 1 is relatively the most impactful for advertising money spent on a campaign. Therefore, better decisions can be made as to allocating future advertizing costs by publisher.

Figure 9:
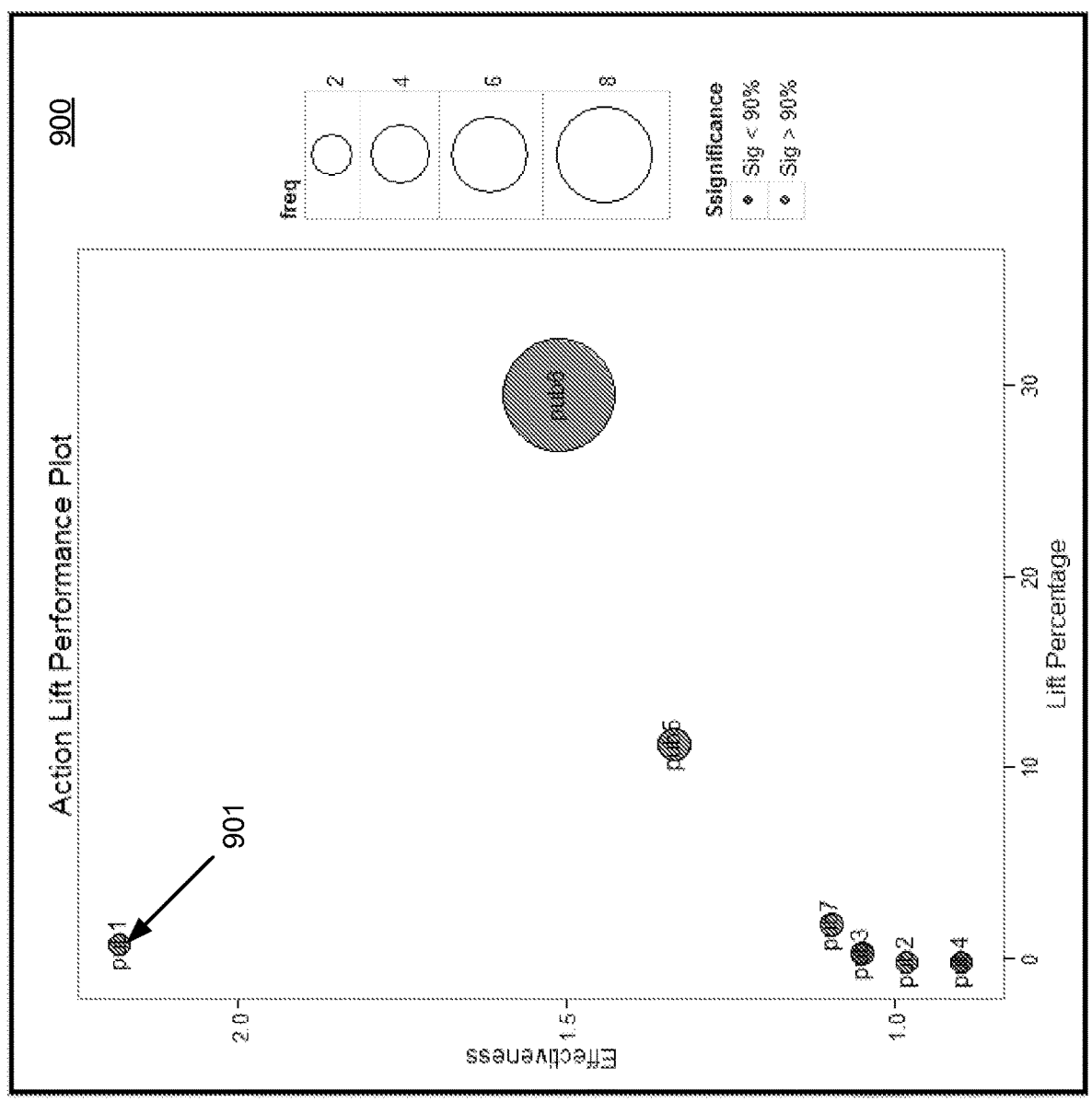
FIG. 9 illustrates an example of a behavior lift performance plot generated by the system.

FIG. 9 illustrates an example 900 of a behavior lift performance plot generated by the system. As can be seen from FIG. 9, the effectiveness of various publishers is shown as a plot of lift percentage and frequency. Of note again is that the system is able to capture the absolute and relative impact of each publisher. Using the example shown in FIG. 9, one can see that the most effective publisher is publisher 901 even though they represent a small number of impressions. If only absolute measures of lift (e.g., lift percentage) were provided, the relative effectiveness of publisher 901 would have been overlooked. However, using the output provided, an advertiser can make effective decisions, for example, finding publisher 901 as a good candidate for increased future allocation.

Figure 10:
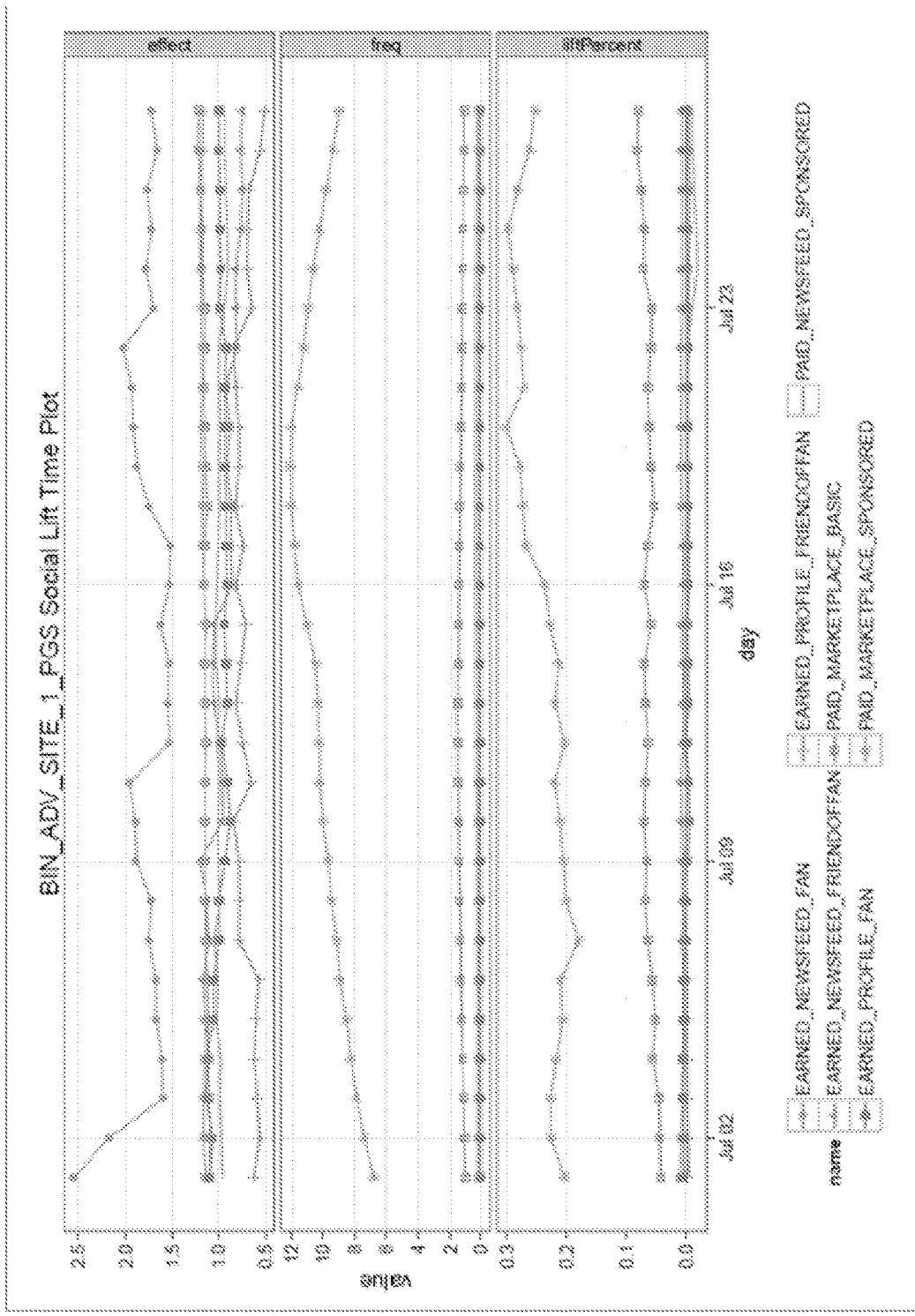
FIG. 10 illustrates an example of a lift performance graph showing effects, frequency, and amount of lift for one bucket for a first page impression over different segments generated by the system.

FIG. 10 illustrates an example 1000 of a lift performance graph showing effects, frequency, and amount of lift for one bucket for a first page impression over different segments.

Traditional test and control methodology only reports campaign level results. However, unlike traditional test methods, the system implementing the lift attribution model is able to take discrete time measurements (e.g., daily traffic) that the system can aggregate to other desired time periods (e.g., the day, week, month, quarter or campaign). As shown in FIG. 10, the lift time plot is able to show daily performance for one aspect of a campaign.

Various reports may be generated by the report general module in any number of forms from spread sheets, graphs, plots, among others, such as shown in FIGS. 7-10. However, because the system is able to use the attribute lift model to provide an automatable, scalable solution, using for example, SQL to Hadoop and an CMx interface, the system may be used to auto populate reports, such as formatted excel templates, or even provide sophisticated automated, interactive user interfaces, such as, for example a dashboard 1100, shown in FIG. 11.

Figure 11:
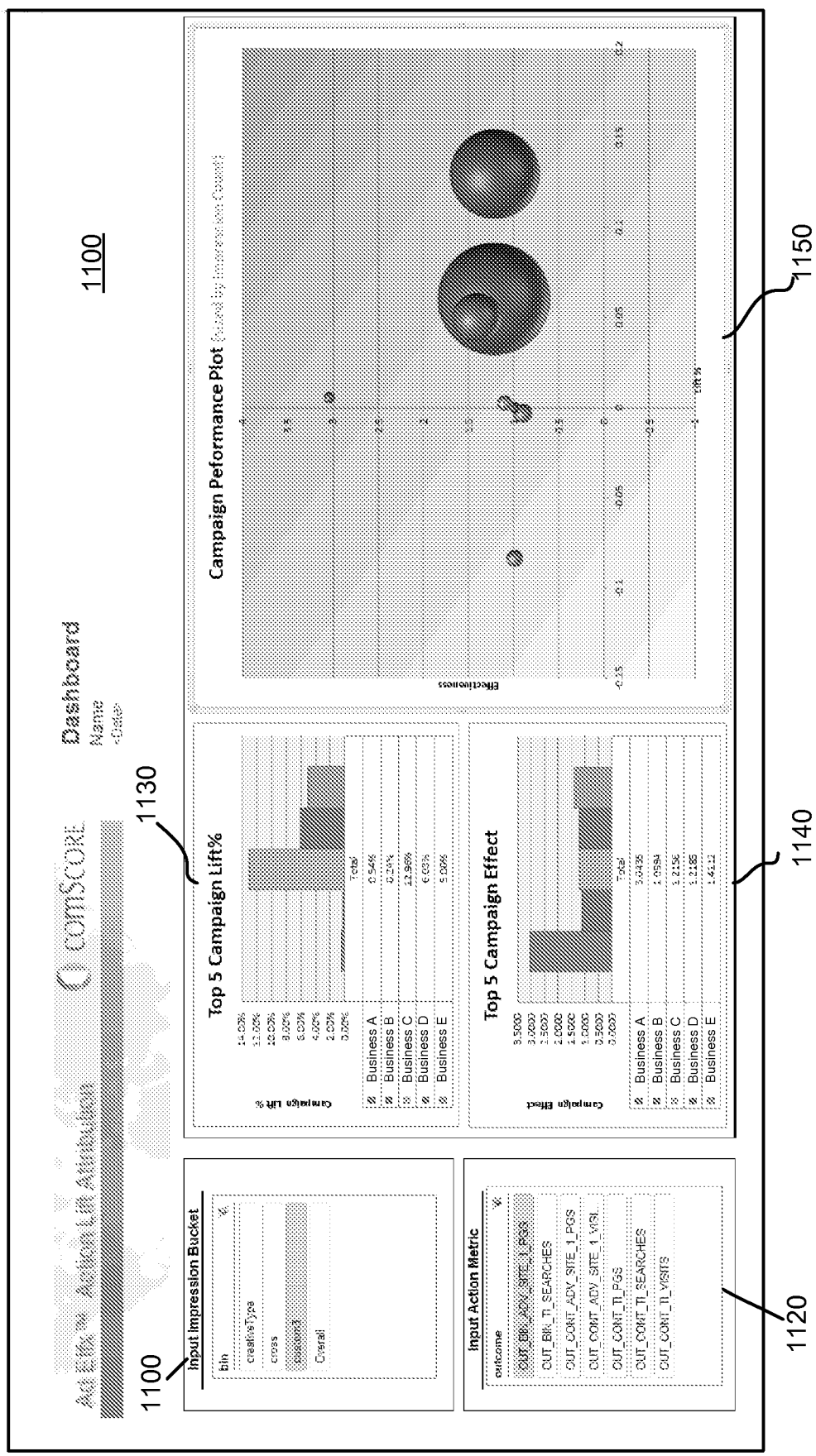
FIG. 11 shows a screen shot of an example of a user interface presenting various inputs to the system and performance plots and graphs generated by the system.

FIG. 11 shows a screen shot of an example of a user interface. As shown, the user interface 1100 allows a user to manipulate the aggregated data to show effects of different metrics on advertising campaigns. The interface includes a number of user inputs 1110 and 1120 to select and manipulate data, and automated outputs 1130, 1140, and 1150 to present effects to the user so that they can make insights and decisions from the collected data.

User input 1110, such as an impression bucket menu allows selection of, for example, a bucket and the impression type. The inputs may be selected from a menu and include, for example, standard defined impression types and custom impression types (e.g., specified by a particular user, publisher, or advertiser or campaign). In addition, there is an input 1120 for the Action metric for which lift is to be determined. For example, an outcome may be selected from a list of outcomes. It should be understood that the user interface is exemplary and that addition forms of input and output could added or omitted and that different configurations may be provided.

The output section includes an outputs 1130, 1140, and 1150 for the selected inputs showing a bar graph for the top 5 business providing campaign lift; the effectiveness of the top 5 businesses, and a campaign performance plot of effectiveness and lift as a function of frequency for the top 5 businesses.

The techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processing devices executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processing devices suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer also will include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A system comprising:
at least one client system comprising at least one storage device and at least one processor configured to execute a monitoring application that collects information about user activity on the Internet and configured to store the information as metric data, the metric data comprising time stamps associated with the user activity for a time period; and
a data processing system comprising one or more storage devices and one or more processors configured to:
access, from the at least one client system, the metric data;
create, based on the time stamps, a record for each discrete time unit of the time period;
parse variables from each record, each variable being associated with a metric in each record;
determine types of the parsed variables;
determine, based on the types of the parsed variables, a first regression modeling function to be applied to a first variable of the parsed variables and a second regression modeling function to be applied to a second variable of the parsed variables;
apply the first regressive modeling function to each metric of the first variable and the second regressive modeling function to each metric of the second variable;
determine, based on the application of the first regressive modeling function and the second regressive modeling function, lift for each discrete time unit of the time period as a difference in an expected outcome of those exposed to at least one impression from those not exposed to the at least one impression; and
generate and store a report based on the lift for each discrete time unit of the time period.

2. The system of claim 1, wherein the one or more processors are configured to apply the first and second regressive modeling functions by applying at least one statistical binomial modeling function.

3. The system of claim 2, wherein the one or more processors are configured to apply the at least one statistical binomial modeling function by applying at least one logistic modelling function.

4. The system of claim 1, wherein the one or more processors are configured to apply the first and second regressive modeling functions by applying at least one statistical continuous modeling function.

5. The system of claim 4, wherein the one or more processors are configured to apply the at least one statistical continuous modeling function by applying at least one Poisson modeling function with over-dispersion metric for zero bounded continuous actions.

6. The system of claim 1, wherein the parsed variables from each record comprise at least one of gross impression variables, time adjusted variables, future behavior outcome variables, past behavior outcome variables, or behavior variables.

7. The system of claim 1, wherein the one or more processors are configured to access the metric data for the time period by accessing impression data and behavior data.

8. The system of claim 7, wherein the one or more processors are configured to create the record for each discrete time unit of the time period by segmenting the impression data by at least one of a publisher, a publisher type, a creative type, a creative placement, a media channel, or a demographic group.

9. The system of claim 7, wherein the behavior data are at least one of total internet usage, brand searches, site visits, or purchases.

10. The system of claim 1, wherein the one or more processors are configured to determine the lift for each discrete time unit of the time period by determining a pre-period before a time in the time period and a post-period after the time in the time period.

11. A method comprising:
collecting, using a monitoring application executed by at least one client system, information about user activity on the Internet;
storing the information as metric data, the metric data comprising time stamps associated with the user activity for a time period;
accessing the metric data;
creating, based on the time stamps, a record for each discrete time unit of the time period;
parsing variables from each record, each variable being associated with a metric in each record;
determining types of the parsed variables;
determining, based on the types of the parsed variables, a first regression modeling function to be applied to a first variable of the parsed variables and a second regression modeling function to be applied to a second variable of the parsed variables;
applying the first regressive modeling function to each metric of the first variable and the second regressive modeling function to each metric of the second variable;
determining, based on the application of the first regressive modeling function and the second regressive modeling function, lift for each discrete time unit of the time period as a difference in an expected outcome of those exposed to at least one impression from those not exposed to the at least one impression; and
generating and storing a report based on the lift for each discrete time unit of the time period.

12. The method of claim 11, wherein accessing the metric data for the time period comprises accessing impression data and behavior data.

13. A non-transitory computer-readable medium comprising instructions executable by at least one processor to perform a method, the method comprising:
collecting, using a monitoring application executed by at least one client system, information about user activity on the Internet;
storing the information as metric data, the metric data comprising time stamps associated with the user activity for a time period;
accessing the metric data;
creating, based on the time stamps, a record for each discrete time unit of the time period;
parsing variables from each record, each variable being associated with a metric in each record;
determining types of the parsed variables;
determining, based on the types of the parsed variables, a first regression modeling function to be applied to a first variable of the parsed variables and a second regression modeling function to be applied to a second variable of the parsed variables;
applying the first regressive modeling function to each metric of the first variable and the second regressive modeling function to each metric of the second variable;
determining, based on the application of the first regressive modeling function and the second regressive modeling function, lift for each discrete time unit of the time period as a difference in an expected outcome of those exposed to at least one impression from those not exposed to the at least one impression; and
generating and storing a report based on the lift for each discrete time unit of the time period.

14. The non-transitory computer-readable medium of claim 13, wherein the instructions executable by the at least one processor to perform accessing the metric data for the time period comprise instructions executable by the at least one processor to perform accessing impression data and behavior data.

15. The system of claim 1, wherein the user activity comprises access of one or more web pages.

16. The method of claim 11, wherein the user activity comprises access of one or more web pages.

17. The non-transitory computer-readable medium of claim 13, wherein the user activity comprises access of one or more web pages.

18. The system of claim 1, wherein the monitoring application is configured to collect information regarding HTTP requests and subsequent HTTP responses.

19. The system of claim 1, wherein the monitoring application is configured to collect the URLs of web pages accessed by the user, times the web pages were accessed by the user, and an identifier associated with the client system device on which the application is executed.

* * * * *